US009087491B2

(12) United States Patent
Nakanishi et al.

(10) Patent No.: US 9,087,491 B2
(45) Date of Patent: Jul. 21, 2015

(54) DISPLAY APPARATUS WITH TOUCH DETECTION FUNCTION, DRIVE CIRCUIT, METHOD OF DRIVING DISPLAY APPARATUS WITH TOUCH DETECTION FUNCTION, AND ELECTRONIC DEVICES

(75) Inventors: Takayuki Nakanishi, Kanagawa (JP); Hiroshi Mizuhashi, Kanagawa (JP)

(73) Assignee: Japan Display Inc., Tokyo (JP)

( * ) Notice: Subject to any disclaimer, the term of this patent is extended or adjusted under 35 U.S.C. 154(b) by 108 days.

(21) Appl. No.: 13/067,829

(22) Filed: Jun. 29, 2011

(65) Prior Publication Data
US 2012/0044167 A1 Feb. 23, 2012

(30) Foreign Application Priority Data
Aug. 23, 2010 (JP) ................................. 2010-186196

(51) Int. Cl.
G06F 3/041 (2006.01)
G09G 3/36 (2006.01)
G06F 3/044 (2006.01)

(52) U.S. Cl.
CPC .............. *G09G 3/3655* (2013.01); *G06F 3/044* (2013.01); *G06F 3/0412* (2013.01); *G09G 3/3677* (2013.01); *G06F 2203/04103* (2013.01); *G06F 2203/04108* (2013.01); *G09G 2300/0434* (2013.01); *G09G 2310/0218* (2013.01); *G09G 2310/08* (2013.01); *G09G 2320/0209* (2013.01); *G09G 2330/021* (2013.01)

(58) Field of Classification Search
CPC ....................................................... G06F 3/088
USPC ....................................... 345/173; 178/18.01
See application file for complete search history.

(56) References Cited

U.S. PATENT DOCUMENTS

| 5,945,973 | A | * | 8/1999 | Sakai et al. | .................... 345/104 |
| 2008/0062139 | A1 | | 3/2008 | Hotelling et al. | |
| 2008/0062140 | A1 | * | 3/2008 | Hotelling et al. | ............. 345/173 |
| 2008/0062147 | A1 | | 3/2008 | Hotelling et al. | |

(Continued)

FOREIGN PATENT DOCUMENTS

| CN | 101501618 A | 8/2009 |
| CN | 101556783 A | 10/2009 |

(Continued)

OTHER PUBLICATIONS

Japanese Office Action issued Oct. 1, 2013 for corresponding Japanese Application No. 2010-186196.

(Continued)

*Primary Examiner* — Quan-Zhen Wang
*Assistant Examiner* — Chad Dicke
(74) *Attorney, Agent, or Firm* — Fishman Stewart Yamaguchi PLLC

(57) ABSTRACT

A display apparatus with a touch detection function, includes: a plurality of common drive electrodes disposed in parallel so as to extend in one direction; a display element displaying on the basis of a pixel signal and a display drive signal; a touch detection element detecting an external approaching object on the basis of a touch-detection drive signal; and a scan drive section performing first scan driving to apply the display drive signal to the plurality of common drive electrodes sequentially by time division and second scan driving having a scan speed different from a scan speed of the first scan driving to apply the touch-detection drive signal to the plurality of common drive electrodes sequentially by time division, wherein the scan drive section drives the common drive electrodes for each plurality of the electrodes in the first and the second scan driving.

18 Claims, 26 Drawing Sheets

(56) References Cited

U.S. PATENT DOCUMENTS

| | | |
|---|---|---|
| 2008/0062148 A1 | 3/2008 | Hotelling et al. |
| 2009/0256818 A1* | 10/2009 | Noguchi et al. ............ 345/174 |
| 2011/0187677 A1 | 8/2011 | Hotelling et al. |
| 2012/0268423 A1 | 10/2012 | Hotelling et al. |

FOREIGN PATENT DOCUMENTS

| | | |
|---|---|---|
| JP | 2009-258182 | 11/2009 |
| JP | 2009-540374 A | 11/2009 |
| TW | 200947030 A | 11/2009 |
| WO | WO-2007/146779 A2 | 12/2007 |

OTHER PUBLICATIONS

Taiwanese Office Action mailed Jul. 24, 2014 for corresponding Taiwanese Application No. 100122078.

Chinese Office Action issued Mar. 11, 2014 for corresponding Chinese Application No. 2011102421618.

* cited by examiner

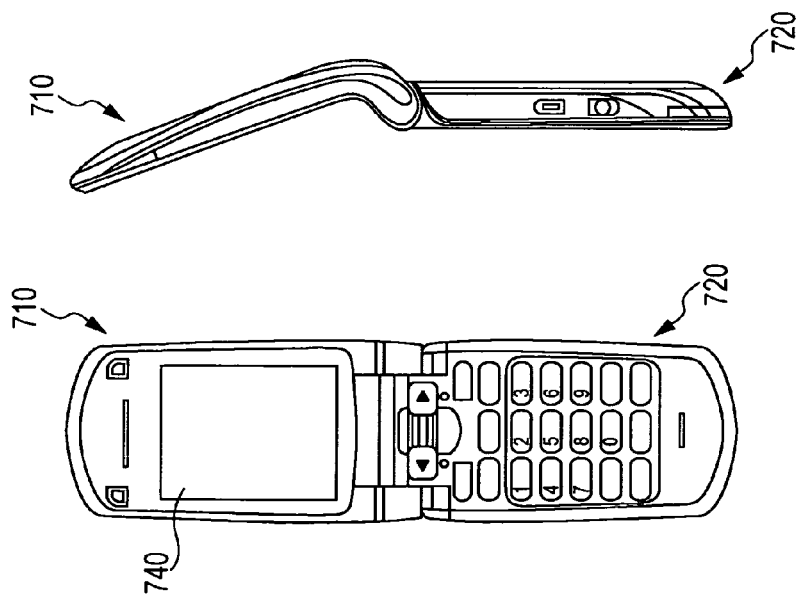
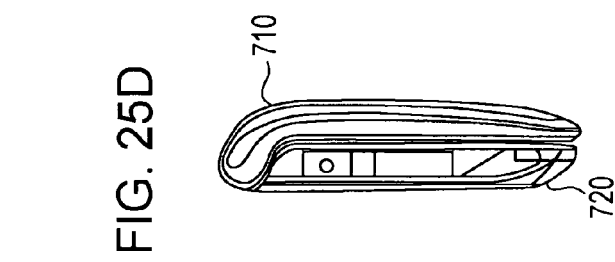
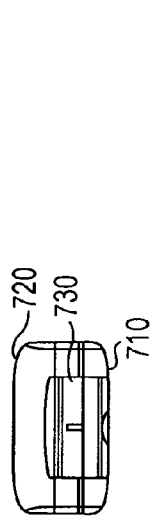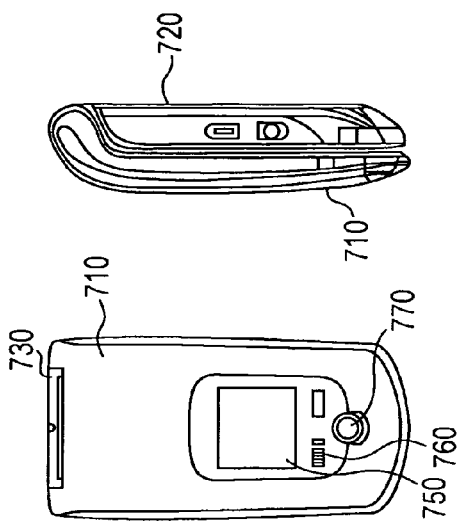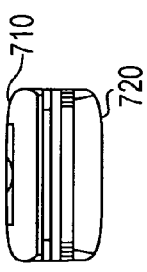

DISPLAY APPARATUS WITH TOUCH DETECTION FUNCTION, DRIVE CIRCUIT, METHOD OF DRIVING DISPLAY APPARATUS WITH TOUCH DETECTION FUNCTION, AND ELECTRONIC DEVICES

BACKGROUND

The present disclosure relates to a display apparatus having a built-in touch detection function for detecting an external approaching object, a drive circuit, a method of driving such a display apparatus, and electronic devices including the same.

In recent years, display apparatuses, such as a liquid-crystal display apparatus, etc., equipped with a touch detection function for detecting an external approaching object, such as a finger, etc., are attracting people's attention. On such apparatuses, various kinds of button images, etc., are displayed so that a user is allowed to input information using those images in place of ordinary mechanical buttons. It is not necessary for the user of the display apparatuses with such a touch detection function to use an input device, such as a keyboard, a mouse, or a keypad. Accordingly, use of such display apparatuses is on the rise in mobile information terminals, such as cellular phones, etc., in addition to computers.

There are several touch detection methods. A capacitive type is provided as one of the methods. For example, Japanese Unexamined Patent Application Publication No. 2009-258182 has proposed a display apparatus in which a common electrode for display that is originally disposed in the display apparatus is used as one of a pair of touch-sensor electrodes, and the other of the electrodes (touch detection electrodes) is disposed so as to intersect the common electrode. A capacitance is formed between the common electrode and the touch detection electrode, and the capacitance changes in accordance with an external approaching object. Using the change, the display apparatus analyzes a touch detection signal that appears on the touch detection electrode when applying a touch-detection drive signal to the common electrode so as to detect the external approaching object. In the display apparatus, a drive signal is applied to the common electrodes in sequence to perform progressive scan in order to carry out display operation. Also, a touch detection signal that appears on the touch detection electrode in accordance with the drive signal is analyzed so that touch detection operation is performed.

SUMMARY

Incidentally, a display apparatus equipped with a touch detection function has a larger circuit area than a display apparatus without a touch detection function. That is to say, it is necessary for a display apparatus with a touch detection function to dispose a drive circuit for touch detection operation in addition to a drive circuit for display operation, and thus the occupied area increases as much as that area. This might result in a large size of the apparatus.

The present disclosure has been made in view of these problems. It is desirable to provide a display apparatus with a touch detection function, which is capable of reducing an occupied area of a circuit and which allows miniaturization of the apparatus, a drive circuit, a method of driving a display apparatus with a touch detection function, and electronic devices.

According to an embodiment of the present disclosure, there is provided a display apparatus with a touch detection function. The display apparatus includes a plurality of common drive electrodes, a display element, a touch detection element, and a scan drive section. The plurality of common drive electrodes are disposed in parallel so as to extend in one direction. The display element displays on the basis of a pixel signal and a display drive signal. The touch detection element detects an external approaching object on the basis of a touch-detection drive signal. The scan drive section performs first scan driving to apply the display drive signal to the plurality of common drive electrodes sequentially by time division and second scan driving having a scan speed different from a scan speed of the first scan driving to apply the touch-detection drive signal to the plurality of common drive electrodes sequentially by time division. The scan drive section drives the common drive electrodes for each plurality of the electrodes in the first and the second scan driving.

According to another embodiment of the present disclosure, there is provided a drive circuit including a scan drive section. To a display section with a touch detection function, which includes a plurality of common drive electrodes disposed in parallel so as to extend in one direction, a display element displaying on the basis of a pixel signal and a display drive signal, and a touch detection element detecting an external approaching object on the basis of a touch-detection drive signal, the scan drive section performs first scan driving to apply the display drive signal to the plurality of common drive electrodes sequentially by time division and second scan driving having a scan speed different from a scan speed of the first scan driving to apply the touch-detection drive signal to the plurality of common drive electrodes sequentially by time division. The scan drive section drives the common drive electrodes for each plurality of the electrodes in the first and the second scan driving.

Also, according to an embodiment of the present disclosure, there is provided a method of driving a display apparatus with a touch detection function. The method includes first scan driving to apply a display drive signal to a plurality of common drive electrodes disposed in parallel so as to extend in one direction sequentially by time division for each plurality of the electrodes and to apply a pixel signal to a pixel electrode corresponding to a common drive electrode having the display drive signal applied thereto in synchronism with application of the display drive signal sequentially by time division so as to display on the basis of the pixel signal and the display drive signal, and second scan driving to apply a touch-detection drive signal for detecting an external approaching object to the plurality of common drive electrodes at a scan speed different from the first scan drive operation sequentially by time division for each plurality of pieces.

An electronic device according to an embodiment of the present disclosure includes a display apparatus with a touch detection function, and corresponds to, for example, a television set, a digital camera, a personal computer, a video camera, or to a mobile terminal apparatus, such as a cellular phone, etc.

In a display apparatus with a touch detection function according to an embodiment of the present disclosure, a drive circuit, a method of driving a display apparatus with a touch detection function, and electronic devices, a display drive signal is applied to common drive electrodes in sequence as first scan driving at the time of display operation, and a touch-detection drive signal is applied in sequence as second scan driving at the time of touch detection operation to the common drive electrodes. On that occasion, the common drive electrodes are driven for each plurality of the electrodes.

In a display apparatus with a touch detection function according to an embodiment of the present disclosure, for example, when a common drive electrode to be a target of the first scan driving and a common drive electrode to be a target of the second scan driving overlap, the scan drive section preferably applies the display drive signal to the overlapping common drive electrode. Further, for example, in the first scan driving, the scan drive section preferably applies the same display drive signal to a common drive electrode corresponding to a display element having the pixel signal applied thereto and at least to a common drive electrode adjacent to the common drive electrode.

The liquid-crystal display element may be for the display element, for example. Also, the touch detection element may detect the external approaching object using a change in electrostatic capacitance on the basis of proximity or touch of the external approaching object.

In a display apparatus with a touch detection function according to an embodiment of the present disclosure, there is provided a drive circuit, a drive circuit, a method of driving a display apparatus with a touch detection function, and electronic devices, common drive electrodes are driven for each plurality of the electrodes so that it is possible to reduce an occupied area of the circuit and to allow miniaturization of the apparatus.

BRIEF DESCRIPTION OF THE DRAWINGS

FIGS. 25A to 25G are a front view, side views, a top view, and a bottom view illustrating an outer configuration of Application-5;

DETAILED DESCRIPTION OF EMBODIMENTS

Figure 1:
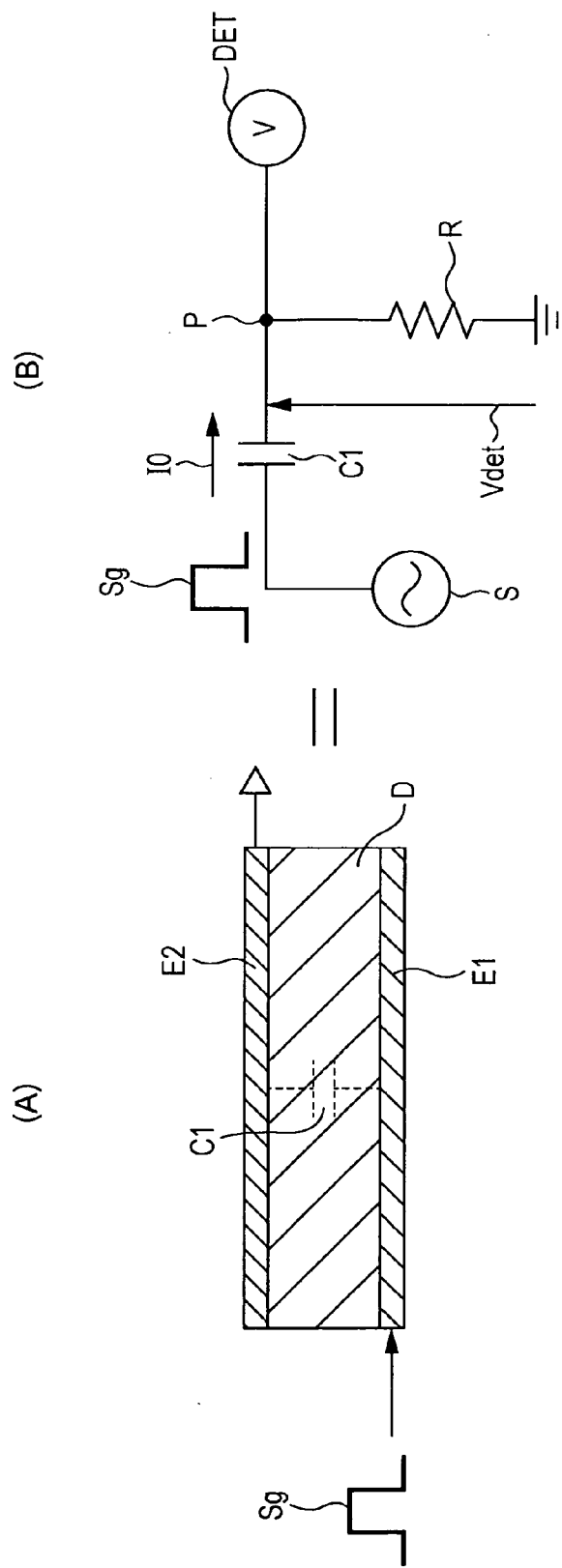
FIG. 1 is a diagram for explaining a basic principle of a touch detection method in a display apparatus with a touch detection function according to an embodiment of the present disclosure, and is a diagram illustrating a state in which a finger is not in touch or is not in proximity.

In the following, detailed descriptions will be given of embodiments of the present disclosure with reference to the drawings. In this regard, the descriptions will be given in the following order.
1. Basic principle of capacitive touch detection
2. First embodiment
3. Second embodiment
4. Third embodiment
5. Applications 1. Basic Principle of Capacitive Touch Detection First, a description will be given of a basic principle of touch detection in a display apparatus with a touch detection function according to the present disclosure with reference to FIG. 1 to FIG. 3. In this touch detection method, a capacitive touch sensor is realized, for example, as shown in FIG. 1(A), by forming a capacitor element using a pair of electrodes (a drive electrode E1 and a touch detection electrode E2) disposed as opposed to each other with a dielectric material D sandwiched therebetween. This structure is represented by an equivalent circuit shown in FIG. 1(B). The drive electrode E1, the touch detection electrode E2 and the dielectric material D constitute a capacitor element C1. One end of the capacitor element C1 is connected to an alternating-current signal source (drive signal source) S, and the other end P thereof is connected to ground through a resistor R, and to a voltage detector (touch detection section) DET. When the alternating-current signal source S supplies an alternating-current rectangular wave Sg (FIG. 3(B)) having a predetermined frequency (for example, about several kHz to tens of kHz) to the drive electrode E1 (one end of the capacitor element C1), an output waveform (a touch detection signal Vdet) as shown in FIG. 3(A) appears on the touch detection electrode E2 (the other end P of the capacitor element C1). In this regard, the alternating-current rectangular wave Sg corresponds to a touch-detection drive signal Vcomt described later.

In a state in which a finger is not in touch (or proximity), as shown in FIG. 1, a current I0 flows in accordance with a capacitance value of the capacitor element C1 with charge and discharge of the capacitor element C1. The voltage waveform of the other end P of the capacitor element C1 at this time becomes, for example, a waveform V0 in FIG. 3(A), and this waveform is detected by the voltage detector DET.

Figure 2:
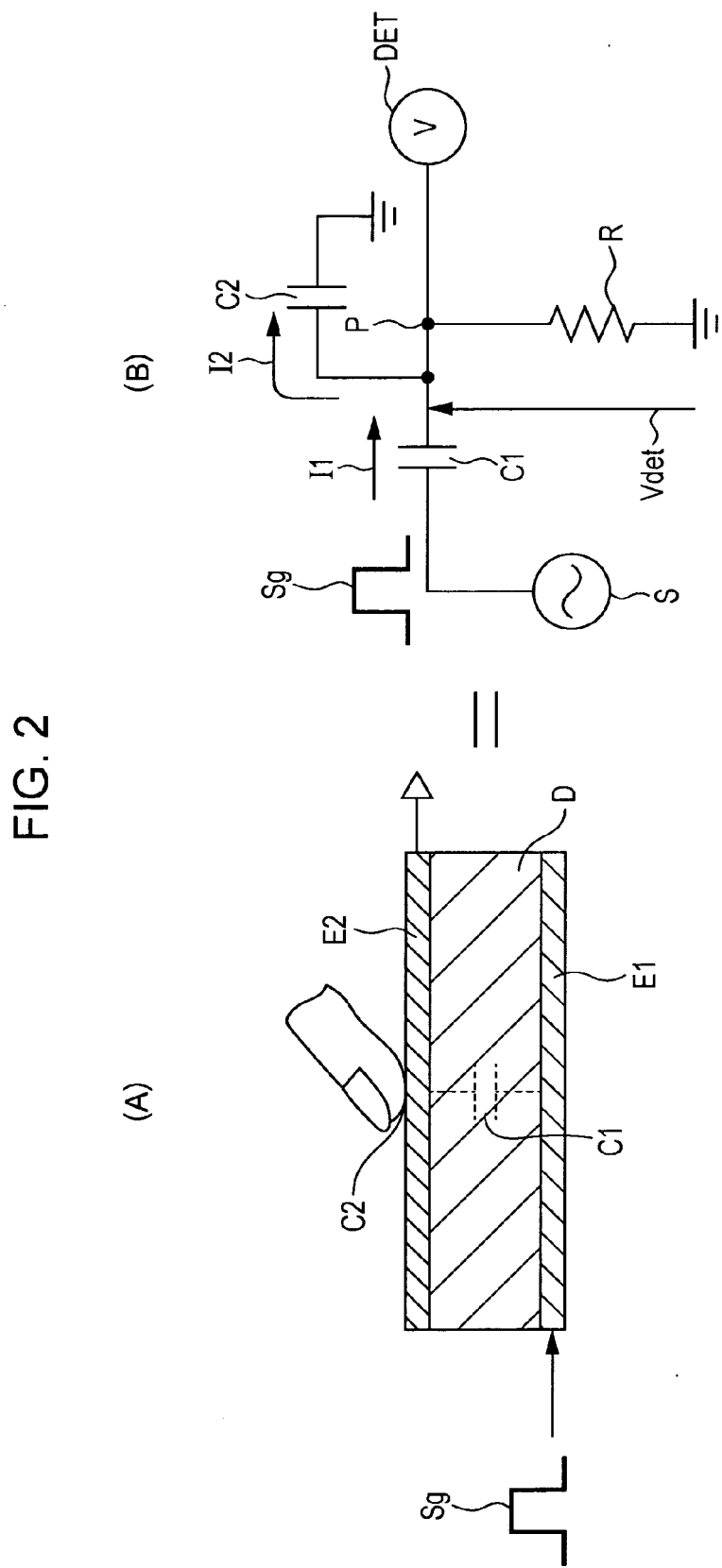
FIG. 2 is a diagram for explaining a basic principle of a touch detection method in a display apparatus with a touch detection function according to an embodiment of the present disclosure, and is a diagram illustrating a state in which a finger is in touch or in proximity.
Figure 3:
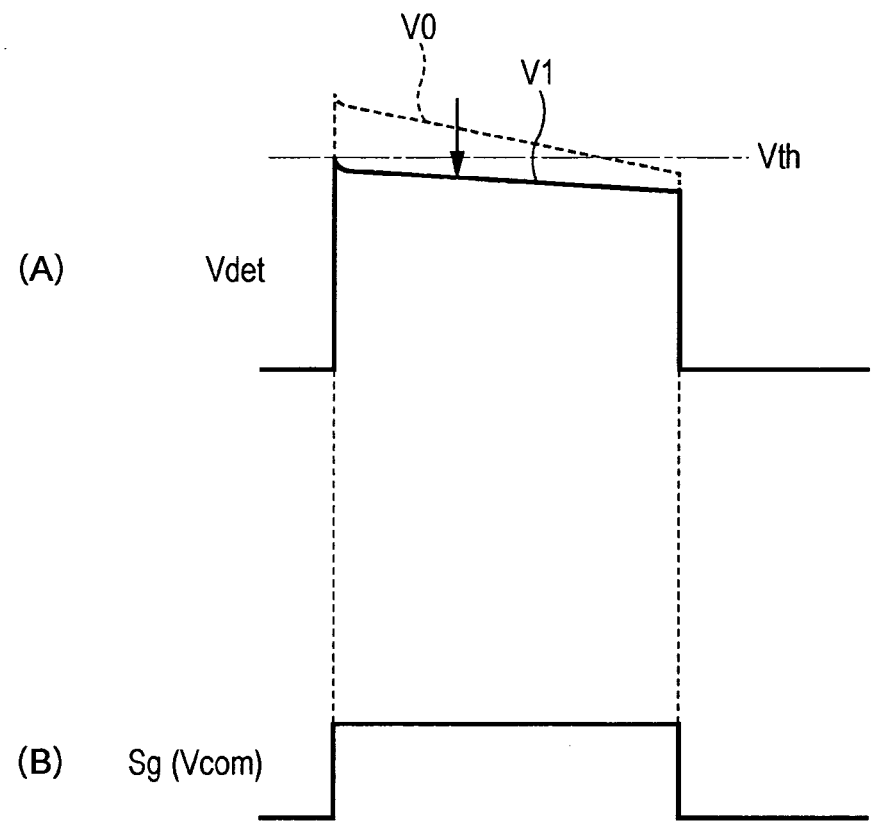
FIG. 3 is a diagram for explaining a basic principle of a touch detection method in a display apparatus with a touch detection function according to an embodiment of the present disclosure, and is a diagram illustrating an example of waveforms of a drive signal and a touch detection signal.

On the other hand, in a state in which a finger is in touch (or proximity), as shown in FIG. 2, a capacitor element C2 formed by the finger is added to the capacitor element C1 in series. In this state, currents I1 and I2 flow with charge and discharge of the capacitor elements C1 and C2, respectively. The voltage waveform of the other end P of the capacitor element C1 at this time becomes, for example, a waveform V1 in FIG. 3(A), and this waveform is detected by the voltage detector DET. At this time, a potential of the point P becomes a divided potential determined by values of the currents I1 and I2 flowing through the capacitor elements C1 and C2, respectively. Accordingly, the waveform V1 becomes a smaller value than the waveform V0 in a non-contact state. The voltage detector DET compares the detected voltage with a predetermined threshold voltage Vth, and determines to be in a non-contact state if the detected voltage is not less than the threshold voltage. On the other hand, the voltage detector DET determines to be in a contact state if the detected voltage is less than the threshold voltage. In this manner, touch detection becomes possible.

2. First Embodiment

Example of Configuration

Example of Overall Configuration

Figure 4:
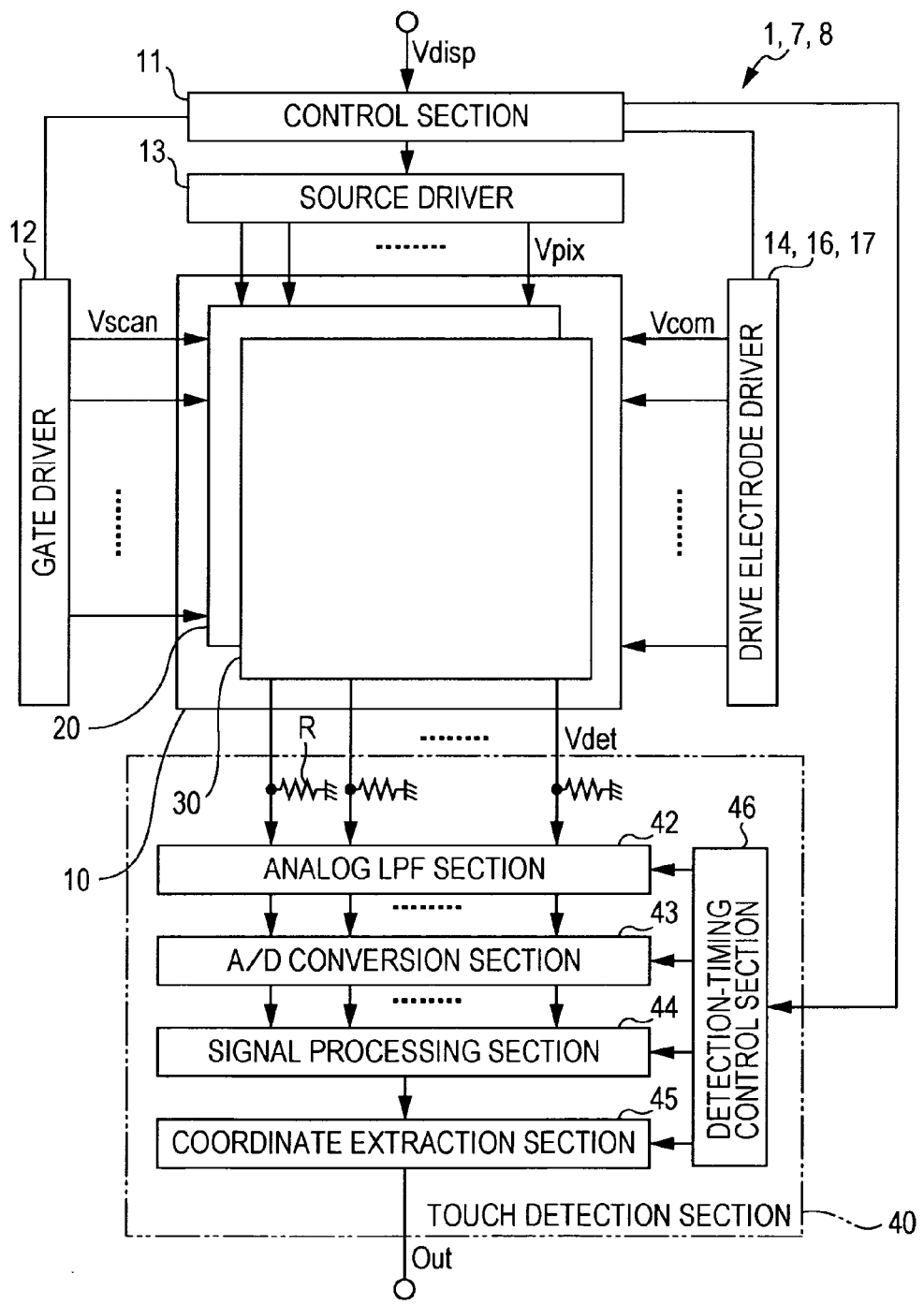
FIG. 4 is a block diagram illustrating an example of a configuration of a display apparatus with a touch detection function according to an embodiment of the present disclosure.

FIG. 4 illustrates an example of a configuration of a display apparatus with a touch detection function according to a first embodiment of the present disclosure. In this regard, a drive circuit and a method of driving a display apparatus with a touch detection function according to an embodiment of the present disclosure are realized by the present embodiment, and thus descriptions will be given together. The display apparatus with a touch detection function uses a liquid-crystal display element as a display element, and is a so-called in-cell type device in which a liquid-crystal display device including the liquid-crystal display element and a capacitive-touch-detection device are integrated.

The display apparatus with a touch detection function 1 includes a control section 11, a gate driver 12, a source driver 13, a drive electrode driver 14, a display device with a touch detection function 10, and a touch detection section 40.

The control section 11 supplies control signals to the gate driver 12, the source driver 13, the drive electrode driver 14, and the touch detection section 40, respectively, on the basis of a video signal Vdisp supplied from the outside, and controls these in order to operate in synchronization.

The gate driver 12 has a function of selecting one horizontal line to be display-driven of the display device with a touch detection function 10 on the basis of the control signal supplied from the control section 11. Specifically, as described later, the gate driver 12 applies a scan signal Vscan to a gate of a TFT element Tr of a pixel Pix through a scan signal line GCL, and selects one row (1 horizontal line) among pixels Pix formed in a matrix state on a liquid-crystal display device 20 of the display device with a touch detection function 10 in sequence as a target of display drive.

The source driver 13 supplies a pixel signal Vpix to each pixel Pix (described later) of the display device with a touch detection function 10 on the basis of the control signal supplied from the control section 11. Specifically, as described later, the source driver 13 individually supplies the pixel signal Vpix to each pixel Pix constituting one horizontal line selected in sequence by the gate driver 12 through the pixel signal line SGL.

The drive electrode driver 14 supplies a drive signal Vcom to a drive electrode COML (described later) of the display device with a touch detection function 10 on the basis of the control signal supplied from the control section 11. Specifically, the drive electrode driver 14 applies a display drive signal Vcomd for display operation to the drive electrode COML sequentially by time division, and applies a touch-detection drive signal Vcomt for touch detection operation sequentially by time division. At that time, the drive electrode driver 14 drives the drive electrodes COML for each plurality of the electrodes (in this example, for each two electrodes).

The gate driver 13 and the drive electrode driver 14 constitute a scan drive section 50. A detailed description will be given of a configuration of the scan drive section 50 later.

The display device with a touch detection function 10 is a display device including a touch detection function. The display device with a touch detection function 10 has the liquid-crystal display device 20 and a touch detection device 30. The liquid-crystal display device 20 is a device which scans and displays each one horizontal line in sequence in accordance with the scan signal Vscan supplied from the gate driver 12 and the display drive signal Vcomd supplied from the drive electrode driver 14. The touch detection device 30 operates on the basis of a basic principle of the above-described capacitive touch detection, and outputs the touch detection signal Vdet on the basis of the touch-detection drive signal Vcomt supplied from the drive electrode driver 14.

The touch detection section 40 is a circuit that detects whether the touch detection device 30 is touched or not on the basis of the control signal supplied from the control section 11 and the touch detection signal Vdet supplied from the touch detection device 30 of the display device with a touch detection function 10, and if touched, obtains the touched coordinates, etc., in a touch detection area. The touch detection section 40 has an analog LPF (Low Pass Filter) section 42, an A/D conversion section 43, a signal processing section 44, a coordinate extraction section 45, and a detection-timing control section 46. The analog LPF section 42 is a low-pass analog filter that eliminates high-frequency components (noise components) included in the touch detection signal Vdet supplied from the touch detection device 30, and extracts and outputs touch components. A resistor R is individually connected to a point between an input terminal of the analog LPF section 42 and ground in order to give a direct current potential (0 V). In this regard, the direct current potential (0 V) may be given by disposing a switch and turning on the switch for a predetermined time period in place of the resistor R, for example. The A/D conversion section 43 is a circuit that individually converts the analog signal output from the analog LPF section 42 into a digital signal. The signal processing section 44 is a logical circuit that detects whether the touch detection device 30 has been touched or not on the basis of the output signal from the A/D conversion section 43. The coordinate extraction section 45 is a logical circuit that obtains touch-panel coordinates of the touch when the signal processing section 44 has detected a touch. The detection-timing control section 46 controls these circuits to operate in synchronization.

Display device with a touch detection function 10

Next, a detailed description will be given of an example of a configuration of the display device with a touch detection function 10.

Figure 5:
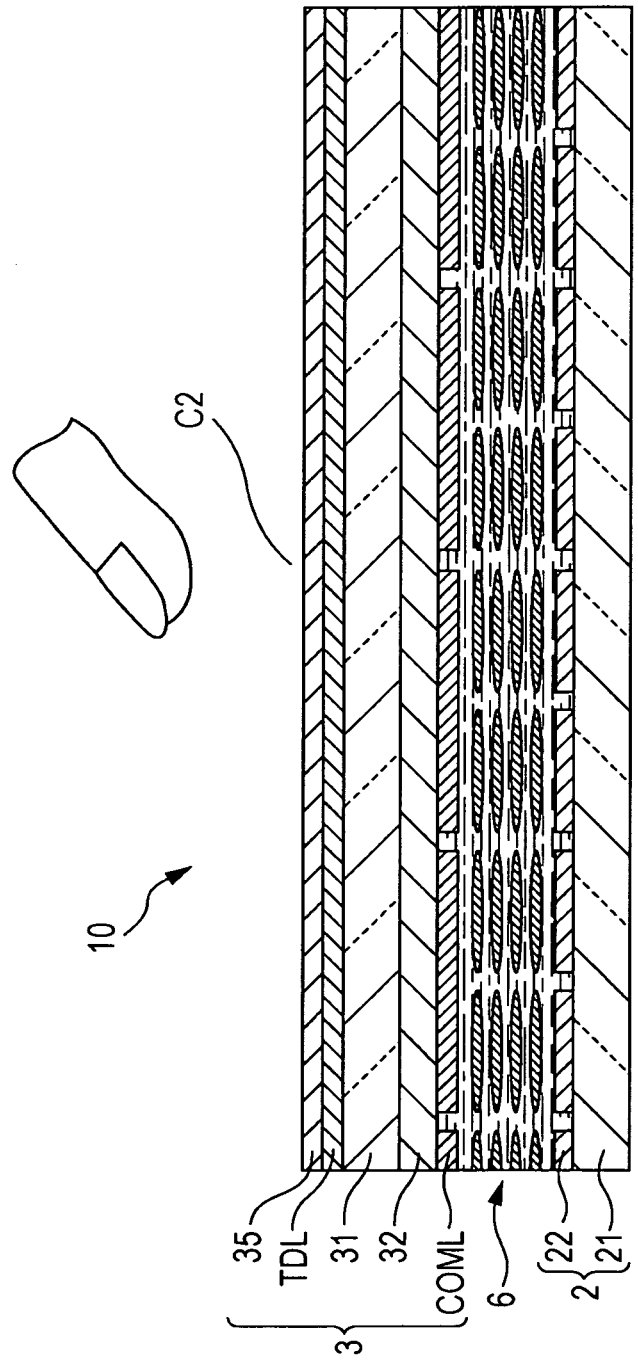
FIG. 5 is a sectional view illustrating a schematic sectional structure of a display device with a touch detection function according to a first embodiment.

FIG. 5 illustrates an example of a schematic sectional structure of the display device with a touch detection function 10. The display device with a touch detection function 10 includes a pixel substrate 2, a counter substrate 3 disposed in an opposed relationship with the pixel substrate 2, and a liquid crystal layer 6 inserted between the pixel substrate 2 and the counter substrate 3.

The pixel substrate 2 has a TFT substrate 21 as a circuit substrate, and a plurality of pixel electrodes 22 disposed in a matrix state on the TFT substrate 21. On the TFT substrate 21, although not shown in the figure, wire lines, such as a pixel signal line SGL supplying a pixel signal Vpix to a thin film transistor (TFT) of each pixel and each pixel electrode 22, and a scan signal line GCL driving each TFT, etc., are formed.

The counter substrate 3 has a glass substrate 31, a color filter 32 formed on one surface of the glass substrate 31, and a plurality of drive electrodes COML formed on the color filter 32. The color filter 32 includes, for example, color filter layers of three colors, namely, red (R), green (G), and blue (B), which are arranged periodically. And a pair of the three colors R, G, and B corresponds to each display pixel. The drive electrode COML functions as a common drive electrode of the liquid-crystal display device 20, and also functions as a drive electrode of the touch detection device 30. The drive electrode COML is linked to the pixel substrate 2 by a contact conductive pillar not shown in the figure. The drive signal Vcom (the display drive signal Vcomd and the touch-detection drive signal Vcomt) having an alternating rectangular waveform is applied from the pixel substrate 2 to the drive electrode COML through the contact conductive pillar. A touch detection electrode TDL, which is a detection electrode of the touch detection device 30 is formed on the other surface of the glass substrate 31. Further, a polarizing plate 35 is disposed on the touch detection electrode TDL.

The liquid crystal layer 6 modulates light passing therethrough in accordance with a state of an electric field, and uses various kinds of liquid crystal, for example, TN (twisted nematic), VA (vertical alignment), ECB (electrically controlled birefringence), etc.

In this regard, alignment films are disposed between the liquid crystal layer 6 and the pixel substrate 2, and between the liquid crystal layer 6 and the counter substrate 3, respectively. Also, an incident polarizing plate is disposed on the under surface of the pixel substrate 2. However, those figures are omitted here.

Figure 6:
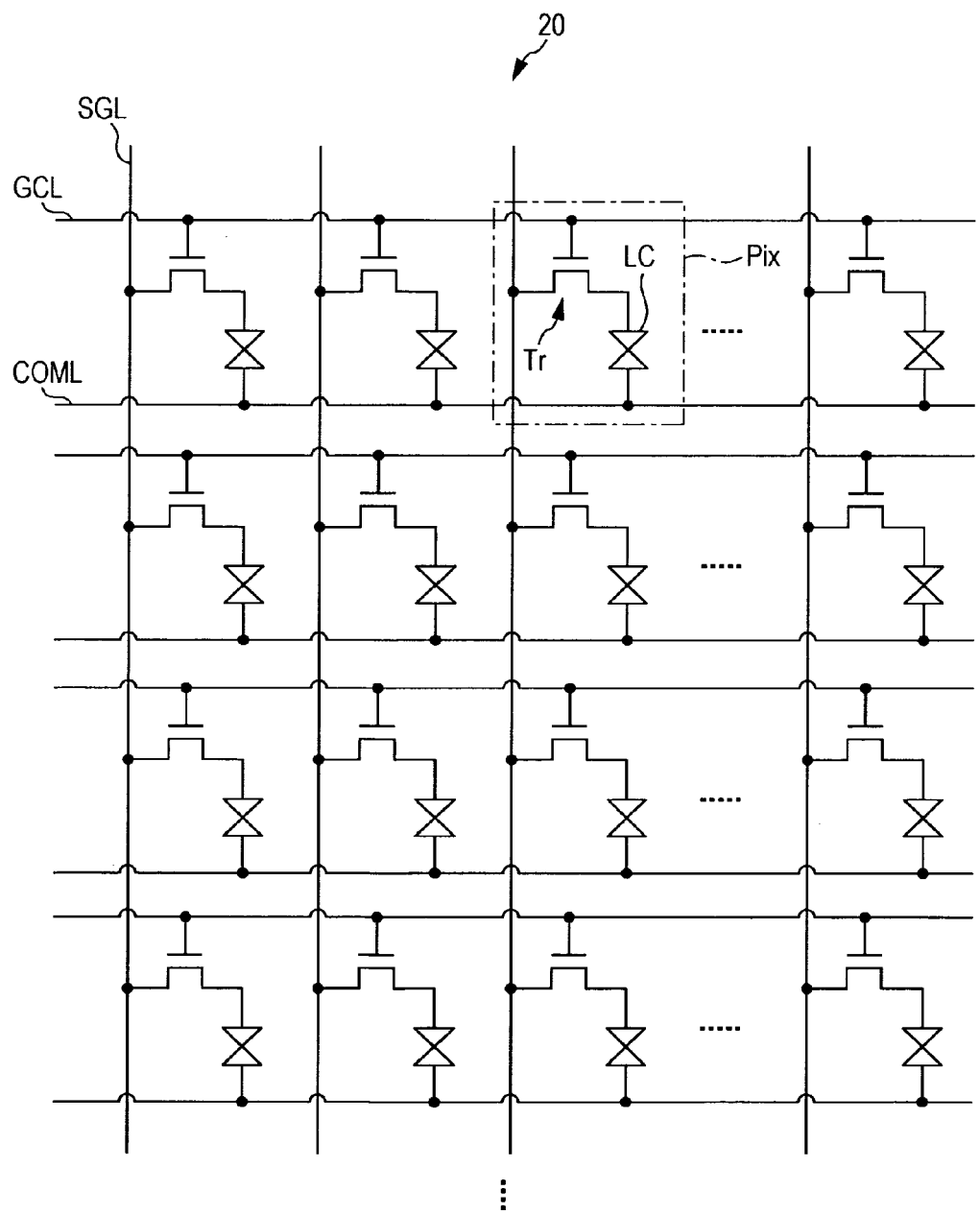
FIG. 6 is a circuit diagram illustrating a pixel array of a display device with a touch detection function according to the first embodiment.

FIG. 6 illustrates an example of a configuration a pixel structure in the liquid-crystal display device 20. The liquid-crystal display device 20 has a plurality of pixels Pix disposed in a matrix state. The pixel Pix has a TFT element Tr and a liquid crystal element LC. The TFT element Tr is formed by a thin film transistor, and in this example, formed by an n-channel MOS (Metal Oxide Semiconductor) TFT. The source of the TFT element Tr is connected to the pixel signal line SGL, the gate is connected to the scan signal line GCL, and the drain is connected to one end of the liquid crystal element LC. One end of the liquid crystal element LC is connected to the drain of the TFT element Tr, and the other end is connected to the drive electrode COML.

A pixel Pix is connected to the other pixels Pix pertaining to a same row of the liquid-crystal display device 20 with one another by a scan signal line GCL. The scan signal line GCL is connected to the gate driver 12, and is supplied with the scan signal Vscan by the gate driver 12. A pixel Pix is connected to the other pixels $P_{ix}$ pertaining to a same column of the liquid-crystal display device 20 with one another by a pixel signal line SGL. The pixel signal line SGL is connected to the source driver 13, and is supplied with a pixel signal Vpix by the source driver 13.

Further, a pixel Pix is connected to the other pixels Pix pertaining to a same row of the liquid-crystal display device 20 by the drive electrode COML. The drive electrode COML is connected to the drive electrode driver 14, and is supplied with a drive signal Vcom by the drive electrode driver 14.

With this arrangement, in the liquid-crystal display device 20, the gate driver 12 drives the scan signal lines GCL so as to perform progressive scan by time division so that one horizontal line is selected in sequence, and the source driver 13 supplies a pixel signal Vpix to each pixel Pix pertaining to the one horizontal line to display for each horizontal line.

Figure 7:
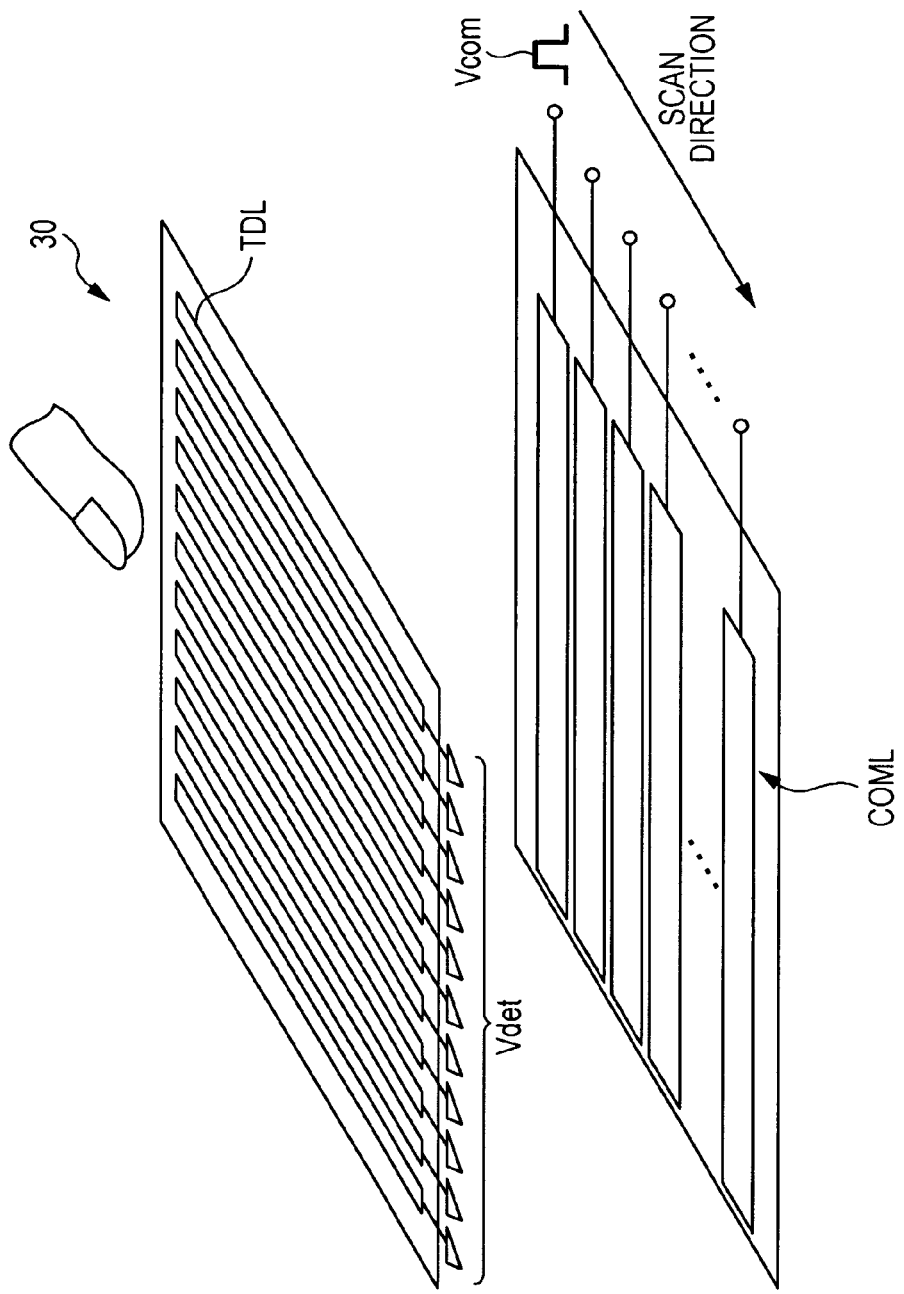
FIG. 7 is a perspective view illustrating an example of a configuration of drive electrodes and touch detection electrodes of a display device with a touch detection function according to the first embodiment.

FIG. 7 is a perspective view illustrating an example of a configuration of the touch detection device 30. The touch detection device 30 includes the drive electrode COML and the touch detection electrode TDL that are disposed on the counter substrate 3. The drive electrode COML is divided into a plurality of (N pieces of) striped electrode patterns extending in right and left direction in the figure. When touch detection operation is performed, the touch-detection drive signal Vcomt is supplied to each electrode pattern in sequence by the drive electrode driver 14 to perform scan drive. The touch detection electrode TDL includes striped electrode patterns extending in a direction perpendicular to the extending direction of the electrode pattern of the drive electrode COML. Each electrode pattern of the touch detection electrode TDL is individually connected to a corresponding input of the analog LPF section 42 of the touch detection section 40. The intersecting electrode patterns of the drive electrode COML and the touch detection electrode TDL with each other forms capacitance at the intersections.

With this arrangement, in the touch detection device 30, when touch detection operation is performed, the drive electrode driver 14 drives the drive electrodes COML so as to sequentially scan the electrodes by time division, and outputs the touch detection signal Vdet from the touch detection electrode TDL, thereby performing touch detection. That is to say, the drive electrode COML corresponds to a drive electrode E1 in the basic principle of the touch detection shown in FIG. 1 to FIG. 3. The touch detection electrode TDL corresponds to the touch detection electrode E2, and the touch detection device 30 performs touch detection in accordance with the basic principle. As shown in FIG. 7, the electrode patterns intersecting with each other constitute capacitive touch sensors in a matrix state. Accordingly, by scanning the entire touch detection surface of the touch detection device 30, it is possible to detect a position at which an external approaching object has touched or come close.

Next, a detailed description will be given of an example of a configuration of the scan drive section 50 including the gate driver 12 and the drive electrode driver 14.

Scan Drive Section 50

Figure 8:
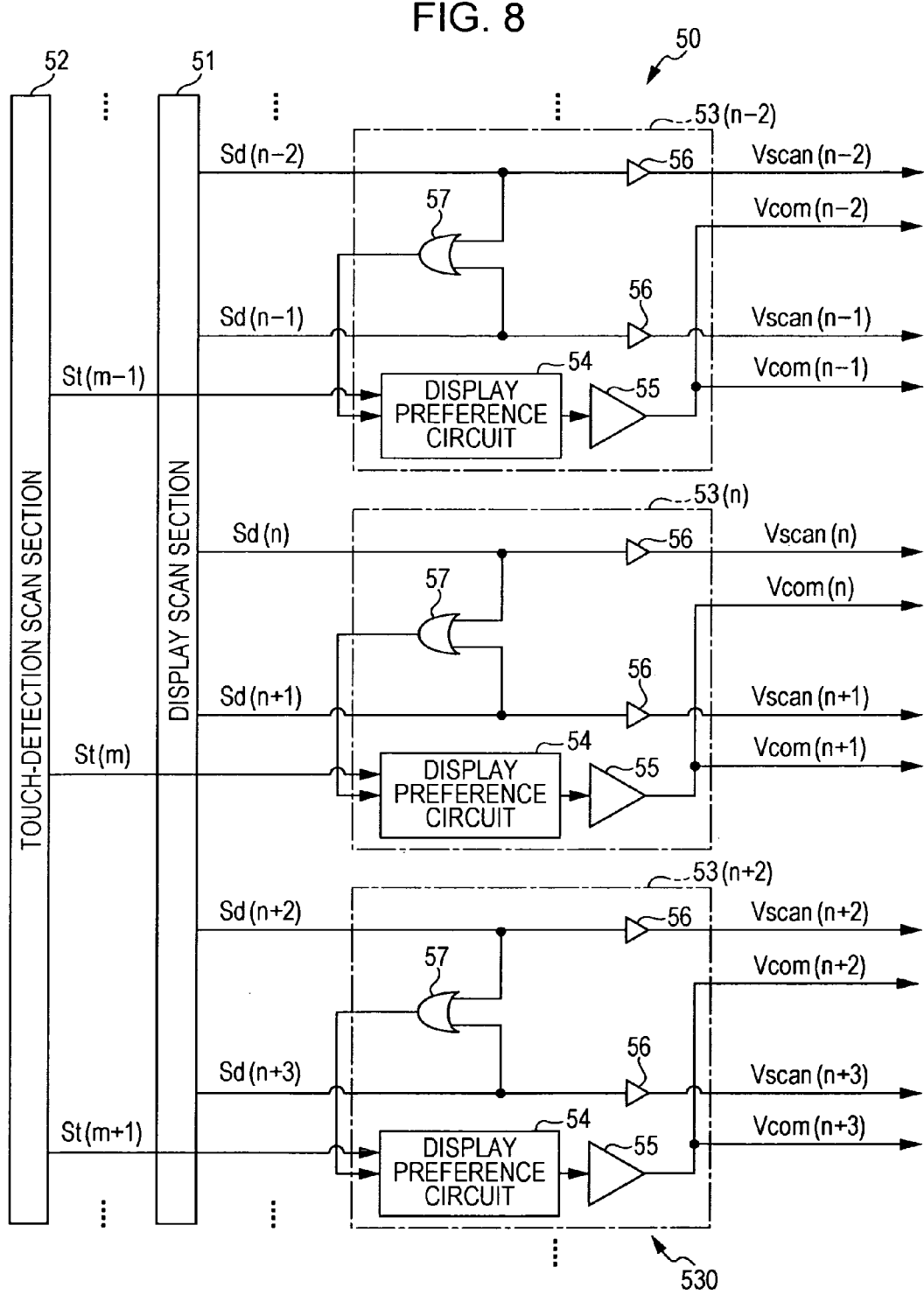
FIG. 8 is a block diagram illustrating an example of a configuration of a scan drive section according to the first embodiment.

FIG. 8 illustrates an example of a configuration of the scan drive section 50. The scan drive section 50 includes a display scan section 51, a touch-detection scan section 52, and a drive section 530. A part of the display scan section 51 and the drive section 530 constitute the gate driver 12. Also, a part of the touch-detection scan section 52 and the drive section 530 constitute the drive electrode driver 14. The drive section 530 includes N/2 drive sections 53(1) to 53(N/2). Hereinafter, a drive section 53 is simply used to denote any one of the N/2 drive sections 53(1) to 53(N/2).

The display scan section 51 includes a shift register, and generates a signal Sd for selecting a scan signal line GCL to which the scan signal Vscan is applied in sequence. Also, the signal Sd is used for selecting a drive electrode COML to which the display drive signal Vcomd is applied. Specifically, as described later, when the display scan section 51 supplies a high-level signal to the n-th drive section 53($n$) as a n-th signal Sd(n), the drive section 53($n$) applies a scan signal Vscan(n) to the n-th scan signal line GCL, and applies a display drive signal Vcomd both to the n-th and the (n+1)-th drive electrodes COML(n) and COML(n+1). That is to say, the display scan section 51 outputs a high-level signal Sd so as to instruct the drive section 530 to perform display-drive.

The touch-detection scan section 52 includes a shift register, and generates a signal St for selecting a drive electrode COML to which the touch-detection drive signal Vcomt is applied in sequence. Specifically, as described later, when the touch-detection scan section 52 supplies a high-level signal to a drive section 53($n$) as an m-th signal St(m), the drive section 53($n$) applies the touch-detection drive signal Vcomt both to the n-th and the (n+1)-th drive electrodes COML(n) and COML(n+1). That is to say, the touch-detection scan section 52 outputs a high-level signal St so as to instruct the drive section 530 to perform touch-detection drive.

The drive section 530 applies a scan signal Vscan to the scan signal line GCL and applies a drive signal Vcom to two drive electrodes COML on the basis of two signals, Sd supplied from the display scan section 51 and St supplied from the touch-detection scan section 52. Specifically, the drive section 53($n$) applies the scan signal Vscan(n) to the n-th scan signal line on the basis of the signal Sd(n) supplied from the display scan section 51, and applies the Vscan(n+1) to the (n+1)-th scan signal line on the basis of the signal Sd(n+1), and applies the display drive signal Vcomd both to the n-th and the (n+1)-th drive electrodes COML(n) and COML(n+1) as the drive signals Vcom(n) and Vcom(n+1). Also, the drive section 53($n$) applies the touch-detection drive signal Vcomt both to the n-th and the (n+1)-th drive electrodes COML(n) and COML(n+1) as the drive signal Vcom(n) and the Vcom(n+1) on the basis of the signal St(m) supplied from the touch-detection scan section 52.

The drive section 53 includes two gate buffers 56, an OR circuit 57, a display preference circuit 54, and a drive signal buffer 55.

The two gate buffers 56 are circuits supplying scan signals Vscan to the corresponding scan signal lines GCL (for example, scan signal lines GCL(n) and GCL(n+1)) on the basis of the two signals (for example, Sd(n) and Sd(n+1)) supplied from the display scan section 51, respectively. Specifically, the gate buffer 56 has a function of amplifying the signal Sd to have an amplitude level allowing on/off-control of a TFT element Tr of the liquid-crystal display device 20.

The OR circuit 57 generates logical add (OR) of the two signals (for example, Sd(n) and Sd(n+1)) supplied from the display scan section 51.

The display preference circuit 54 has a function of controlling application of the drive signal Vcom to the drive electrode COML on the basis of the output signal of the OR circuit 57 and the signal St supplied from the touch-detection scan section 52.

The drive signal buffer 55 is a circuit applying the drive signal Vcom to the drive electrode COML on the basis of the signal supplied from the display preference circuit 54. Specifically, the drive signal buffer 55 supplies any one of a display drive signal Vcomd, a touch-detection drive signal Vcomt, and a direct-current drive signal Vcomdc to the drive electrode COML on the basis of the signal supplied from the display preference circuit 54. As shown in FIG. 8, the drive signal buffer 55 supplies the drive signal Vcom to the two drive electrodes COML at the same time.

With this arrangement, in the drive section 53($n$), if at least either one of the signals Sd(n) and Sd(n+1) supplied from the display scan section 51 is a high level, the display preference circuit 54 interprets it as an instruction to display-drive, and thus the drive signal buffer 55 applies the display drive signal Vcomd to both of the drive electrodes COML(n) and COML(n+1). If the signal St(m) supplied from the touch-detection scan section 52 is a high level, the display preference circuit 54 interprets it as an instruction to touch-detection drive, and thus the drive signal buffer 55 applies the touch-detection drive signal Vcomt to both of the drive electrodes COML(n) and COML(n+1). Also, if at least either one of the signals Sd(n) and Sd(n+1) supplied from the display scan section 51 is a high level, and the signal St(m) supplied from the touch-detection scan section 52 is a high level, the drive signal buffer 55 applies the display drive signal Vcomd to both of the drive electrodes COML(n) and COML(n+1). That is to say, if the display preference circuit 54 receives both of the instructions of the display drive and the touch-detection drive, the display preference circuit 54 gives preference to the instruction of the display drive. Also, if the signals Sd(n) and Sd(n+1) supplied from the display scan section 51 are both low level, and when the signal St(m) supplied from the touch-detection scan section 52 is a low level, the display preference circuit 54 interprets it as neither the instruction of the display drive nor the instruction of the touch-detection drive, and thus the drive signal buffer 55 applies the direct-current drive signal Vcomdc to both of the drive electrodes COML(n) and COML(n+1).

In this manner, the drive section 53($n$) applies the display drive signal Vcomd to both of the drive electrodes COML(n) and COML(n+1) in display drive, and applies the touch-detection drive signal Vcomt in touch-detection drive. That is to say, the drive section 530 drives the drive electrode COML for each two electrodes. And a length of the shift register in the touch-detection scan section 52 is about one half that of the display scan section 51 in accordance with selecting the drive electrodes COML for each two electrodes.

Here, the drive electrode COML corresponds to a specific example of the "common drive electrode" according to an embodiment of to the present disclosure. The liquid crystal element LC corresponds to a specific example of the "display element" according to an embodiment of the present disclosure.

Operation and Action

Next, a description will be given of operation and action of the display apparatus with a touch detection function 1 described above.

Overview of Overall Operation

First, a description will be given of an overview of overall operation of the display apparatus with a touch detection function 1 with reference to FIG. 4. The control section 11 supplies control signals to the gate driver 12, the source driver 13, the drive electrode driver 14, and the touch detection section 40, respectively, on the basis of the video signal Vdisp supplied from outside, and controls these to operate in synchronism with one another. The gate driver 12 supplies the scan signal Vscan to the liquid-crystal display device 20, and selects one horizontal line to be display-driven in sequence. The source driver 13 supplies the pixel signal Vpix to each pixel Pix included in the one horizontal line selected by the gate driver 12. The drive electrode driver 14 drives the drive electrode COML for each two electrodes. In display operation, the drive electrode driver 14 applies the display drive signal Vcomd to a drive electrode COML of the one horizontal line to be display-driven in sequence. In touch detection operation, the drive electrode driver 14 applies the touch-detection drive signal Vcomt to the drive electrode COML related to touch detection operation in sequence. The display device with a touch detection function 10 performs display operation on the basis of the signals supplied by the gate driver 12, the source driver 13, and the drive electrode driver 14, and performs touch-detection operation on the basis of the touch-detection drive signal Vcomt supplied from the drive electrode driver 14 to output the touch detection signal Vdet from the touch-detection electrode TDL. The analog LPF section 42 eliminates high-frequency components of the touch detection signal Vdet, and outputs the signal. The A/D conversion section 43 converts the analog signal output from the analog LPF section 42 into a digital signal. The signal processing section 44 detects whether there is a touch on the display device with a touch detection function 10 on the basis of the output signal from the A/D conversion section 43. When the signal processing section 44 has detected a touch, the coordinate extraction section 45 obtains the coordinates of the touch panel. The detection-timing control section 46 controls the analog LPF section 42, the A/D conversion section 43, the signal processing section 44, and the coordinate extraction section 45 to operate in synchronization.

In the following, a description will be given of detailed operation of the display apparatus with a touch detection function 1.

Display Operation and Touch Detection Operation

In the display apparatus with a touch detection function 1, in the display operation, the gate driver 12 applies the scan signal Vscan to a scan signal line GCL, and the drive electrode driver 14 applies a display drive signal Vcomd to the drive electrodes COML corresponding to the scan signal line GCL for each two electrodes in sequence to perform display scan. And, in each one horizontal period (1H), the source driver 13 supplies the pixel signal Vpix to the one horizontal line to which the scan signal Vscan and the display drive signal Vcomd have been applied. Also, in the touch detection operation, the drive electrode driver 14 applies the touch-detection drive signal Vcomt to, for example, 10 drive electrodes COML, and shifts the drive electrode COML to which the touch-detection drive signal Vcomt is applied, for example, for each two electrodes in the one horizontal period to perform the touch detection scan. In each one horizontal period (1H), the touch detection section 40 detects a touch on the basis of the touch detection signal Vdet.

Figure 9:
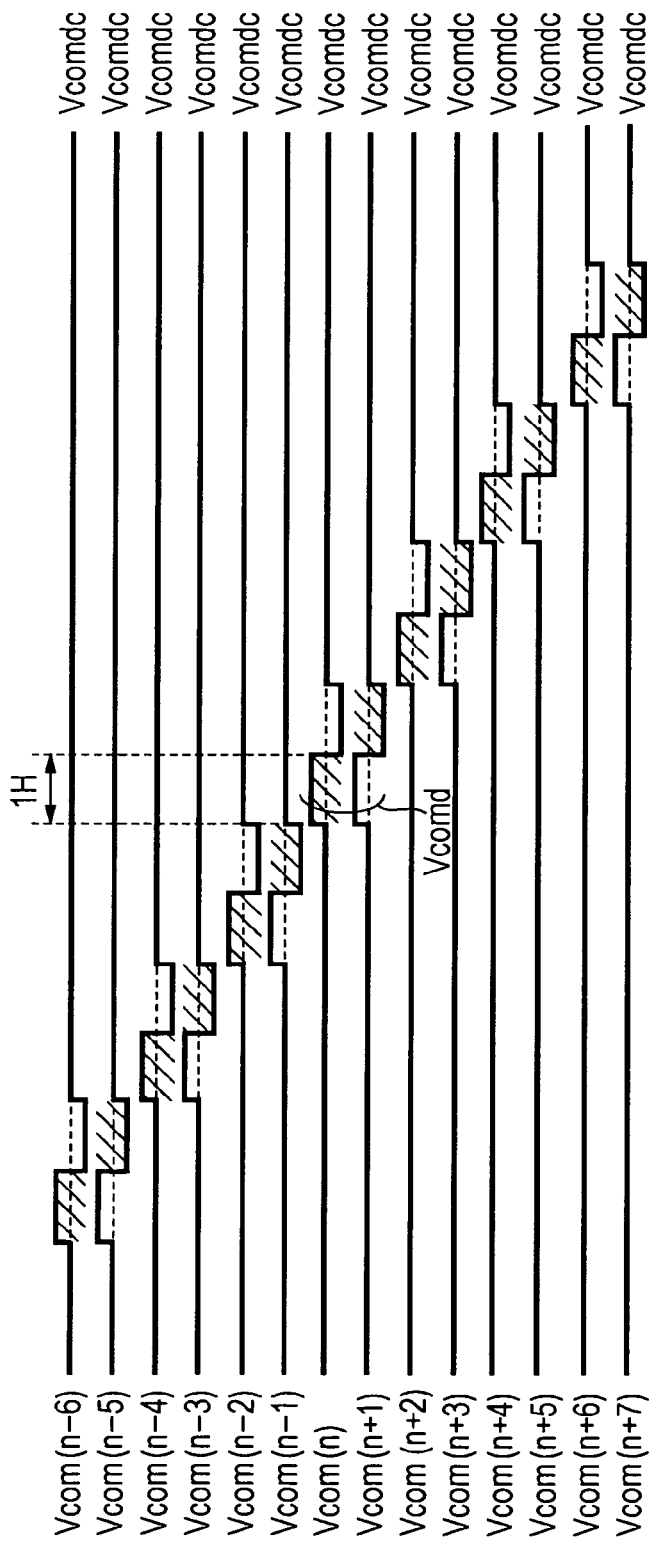
FIG. 9 is a timing waveform chart illustrating an example of operation of a scan drive section according to the first embodiment.

FIG. 9 illustrates an example of display drive operation of the scan drive section 50. As shown in FIG. 9, the scan drive section 50 drives the drive electrode COML for each two electrodes. Specifically, the scan drive section 50 applies the display drive signal Vcomd (for example, drive signals Vcom(n) and Vcom(n+1)) to two drive electrodes COML (for example, the n-th and the (n+1)-th drive electrodes COML(n) and COML(n+1)), respectively. And first, the scan drive section 50 applies the scan signal Vscan to the scan signal line GCL (the n-th scan signal line GCL(n)) corresponding to the drive electrode COML(n) in a first horizontal period (1H), and the source driver 13 applies a pixel signal Vpix to a pixel Pix in the horizontal line. In FIG. 9, a shaded portion indicates the section of the display drive signal Vcomd corresponding to the one horizontal line to which the pixel signal Vpix is applied. Next, the scan drive section 50 inverts the display drive signal Vcomd and applies the scan signal Vscan to the scan signal line GCL (the scan signal line GCL(n+1) of the (n+1)-th row) corresponding to the drive electrode COML(n+1). And the source driver 13 applies the pixel signal Vpix to a pixel Pix in the horizontal line.

FIG. 9 illustrates the display drive operation of the scan drive section 50. However, the touch-detection drive operation is also performed in the same manner. That is to say, the scan drive section 50 applies the touch-detection drive signal Vcomt to, for example, 10 adjacent drive electrodes COML. And the scan drive section 50 shifts the drive electrodes COML to which the touch-detection drive signal Vcomt is applied, for example, for each two electrodes in each one horizontal period to perform the touch detection scan.

The scan drive section 50 is provided with the display scan section 51 and the touch-detection scan section 52 independently. Thereby, it is possible to independently perform the display scan and the touch detection scan.

Figure 10:
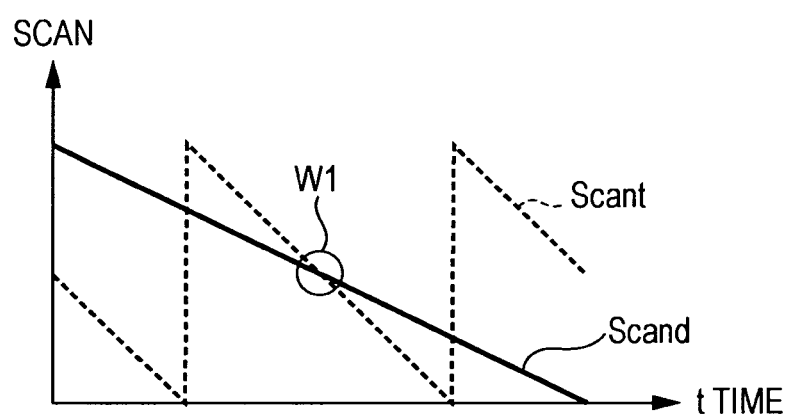
FIG. 10 is a schematic diagram illustrating an example of operation of a display apparatus with a touch detection function according to the first embodiment.

FIG. 10 schematically illustrates the display scan and the touch detection scan. In this example, the touch detection scan is performed at a scan speed two times the scan speed of the display scan. In the display apparatus with a touch detection function 1, it is possible for the scan drive section 50 to perform the display scan Scand and the touch detection scan Scant independently, and thus to apply the display drive signal Vcomd for the display operation and to apply the touch-detection drive signal Vcomt for the touch detection operation separately to the drive electrode COML. Thereby, it is possible to separately set a speed of the touch detection scan Scant and a speed of the display scan Scand. For example, as shown in FIG. 10, if the scan speed of the touch detection is to be higher than that of the display scan, it is possible to quickly respond to a touch by an external approaching object, and thus to improve a response characteristic of touch detection.

In the example shown in FIG. 10, the speed of the touch detection scan is higher than the speed of the display scan, and thus the display scan Scand is overtaken by the touch detection scan Scant at timing W1. At this time, the drive electrode COML to be subjected to display driving and the drive electrode COML to be subjected to touch detection driving overlap. At this time, the scan drive section 50 operates so as to give preference to display drive, and thus applies the display drive signal Vcomd to the drive electrode COML. That is to say, in this overtaking state, the touch-detection drive signal Vcomt is not applied to the drive electrode COML related to the horizontal line to which the pixel signal Vpix is applied. Thereby, it is possible to suppress disorder caused by the overtaking.

Comparative Example

Next, a description will be given of a scan drive section 50R according to a comparative example of the present embodiment. In this comparative example, a drive electrode COML is driven for each one electrode.

Figure 11:
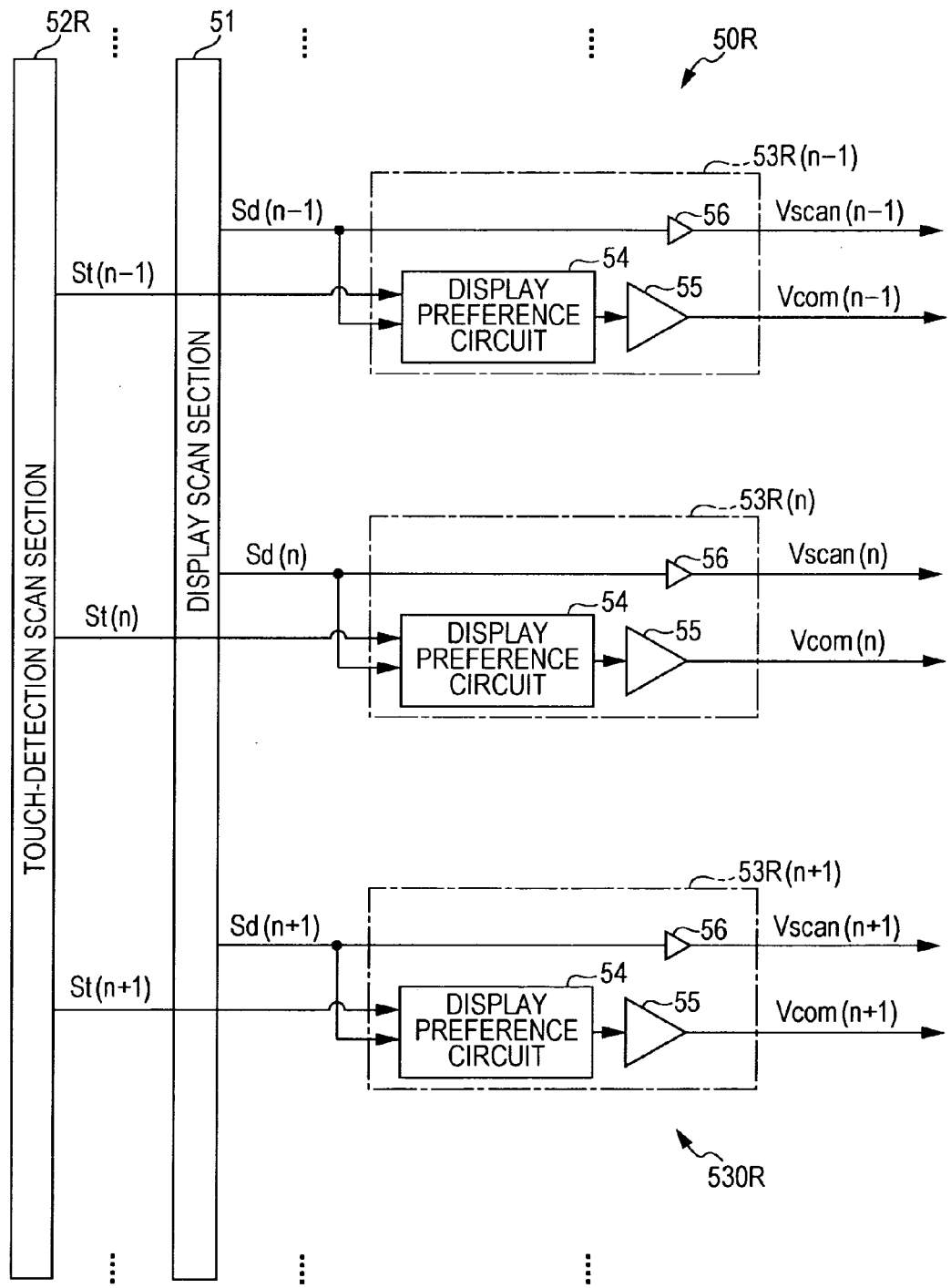
FIG. 11 is a block diagram illustrating an example of a configuration of a scan drive section according to a comparative example of the first embodiment.

FIG. 11 illustrates an example of a configuration of the scan drive section 50. The scan drive section 50 has a touch-detection scan section 52R and a drive section 530R. The drive section 530R includes N drive sections 53R(1) to 53R(N).

The touch-detection scan section 52R generates a signal St for selecting a drive electrode COML to which the touch-detection drive signal Vcomt is applied for each one electrode in sequence. A length of the shift register in the touch-detection scan section 52R is equal to that of the display scan section 51 in accordance with selecting the drive electrode COML for each one electrode.

The drive section 530R applies a scan signal Vscan to a scan signal line GCL and applies drive signal Vcom to a drive electrode COML on the basis of the signal Sd supplied from the display scan section 51 and the signal St supplied from the touch-detection scan section 52R. As shown in FIG. 11, the drive signal buffer 55 of the drive section 53R supplies a drive signal Vcom to one drive electrode COML.

With this arrangement, when performing the display drive and the touch detection drive, the scan drive section 50R according to this comparative example drives the drive electrode COML for each one electrode.

In this comparative example, a length of the shift register in the touch-detection scan section 52R is substantially equal to that of the display scan section 51. Also, the display preference circuit 54 and the drive signal buffer 55 in the drive section 53R are disposed singly for each one drive electrode COML.

On the other hand, in the display apparatus with a touch detection function 1 according to the present embodiment, the length of the shift register in the touch-detection scan section 52 is about one half that of the display scan section 51. Also, the display preference circuit 54 and the drive signal buffer 55 in the drive section 53 are disposed singly for each two drive electrodes COML. That is to say, the circuit size of the touch-detection scan section 52 and the drive section 530 according to the present embodiment becomes about one half the circuit size of the touch-detection scan section 52R and the drive section 530R according to this comparative example. In this manner, the drive electrode COML is driven for each plurality of electrodes so that the circuit size can be reduced, and the occupied area of the circuit can be reduced, thereby making it possible to miniaturize the apparatus. Also, the length of the shift register in the touch-detection scan section 52 can be shortened, and thus a clock frequency of the shift register can be decreased. This makes it possible to reduce power consumption.

Advantages

As described above, in the present embodiment, the drive electrode COML is driven for each plurality of electrodes, and thus it is possible to reduce the circuit size, and to realize miniaturization of the apparatus.

Also, in the present embodiment, the drive electrode COML is driven for each plurality of electrodes. And thus it is possible to shorten the length of the shift register, and thereby to decrease a clock frequency of the shift register. This makes it possible to reduce power consumption.

Also, in the present embodiment, the display drive signal Vcomd is applied all the time to the drive electrode COML related to the horizontal line to which the pixel signal Vpix is applied, and thus it is possible to suppress disorder of display caused by overtaking scan.

Also, in the present embodiment, the display scan and the touch detection scan are allowed to be performed independently. Thus, the scan speed of the touch detection scan can be higher than the scan speed of the display scan, thereby making it possible to improve response performance of touch detection.

Variation-1

In the above-described embodiment, the scan drive section 50 drives the drive electrode COML for each two electrodes. However, the present disclosure is not limited to this. In the following, a detailed description will be given of an example of the case of driving for each four electrodes.

Figure 12:
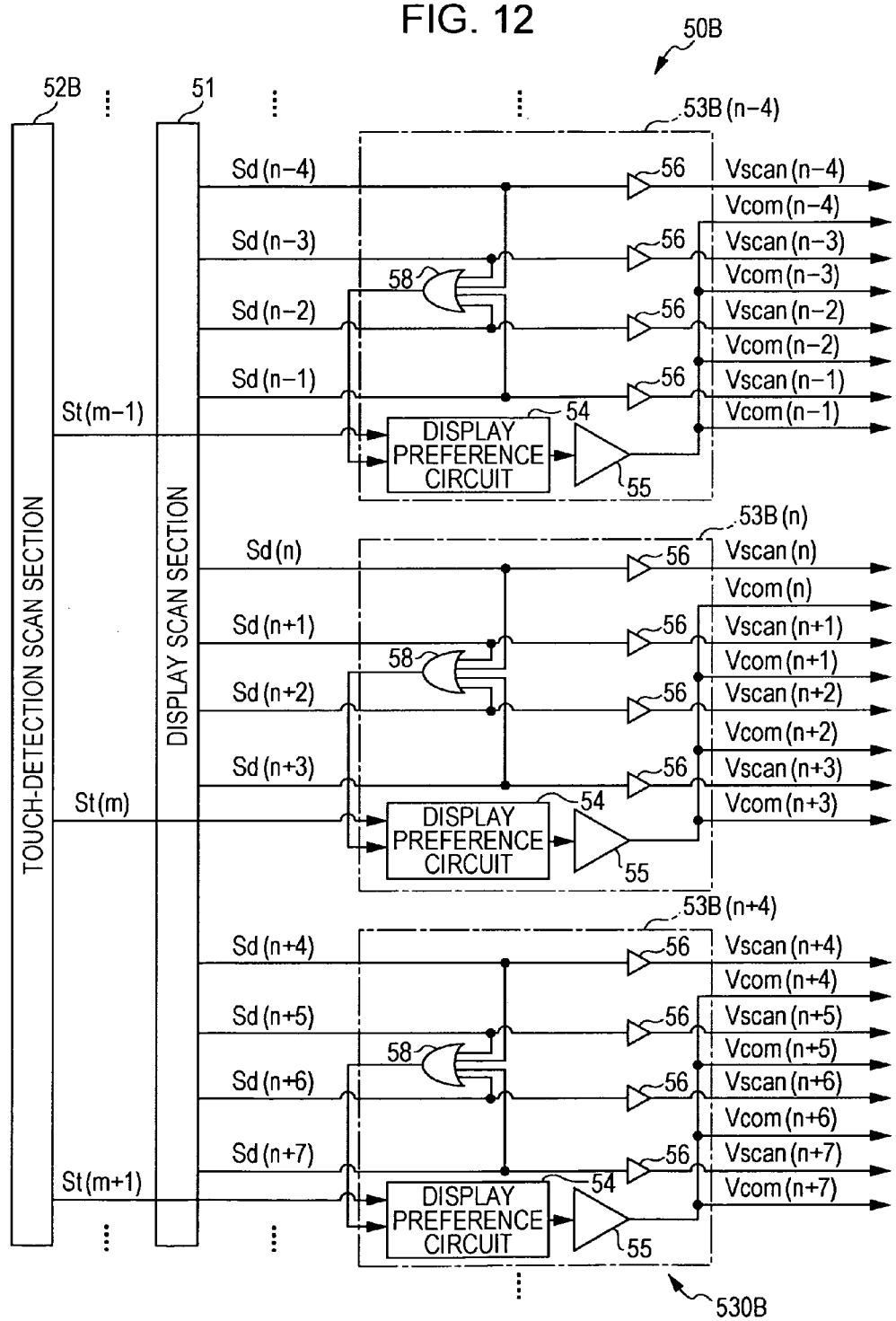
FIG. 12 is a block diagram illustrating an example of a configuration of a scan drive section according to a variation of the first embodiment.

FIG. 12 illustrates an example of a configuration of a scan drive section 50B according to this variation. The scan drive section 50B includes a touch-detection scan section 52B and a drive section 530B. The drive section 530B includes N/4 drive sections 53B(1) to 53B(N/4).

The touch-detection scan section 52B generates a signal St for selecting the drive electrode COML to which the touch-detection drive signal Vcomt is applied in sequence for each four electrodes. A length of the shift register in the touch-detection scan section 52B is about one fourth that of the display scan section 51 in accordance with selecting the drive electrodes COML for each four electrodes.

The drive section 530B applies the scan signal Vscan to the scan signal line GCL, and applies the drive signal Vcom to the four drive electrodes COML on the basis of four signals Sd supplied from the display scan section 51, respectively, and a signal St supplied from the touch-detection scan section 52B. The drive section 53B includes four gate buffers 56 and OR circuits 58. The four gate buffers 56 are circuits applying the scan signal Vscan to a corresponding one of the scan signal lines GCL (for example, scan signal lines GCL(n) to GCL(n+3)) on the basis of the four signals (for example, Sd(n) to Sd(n+3)) supplied from the display scan section 51, respectively. The OR circuit 58 generates a logical add (OR) of the four signals (for example, Sd(n) to Sd(n+3)) supplied from the display scan section 51. As shown in FIG. 12, the drive signal buffer 55 of the drive section 53B simultaneously supplies the drive signal Vcom to the four drive electrodes COML.

Figure 13:
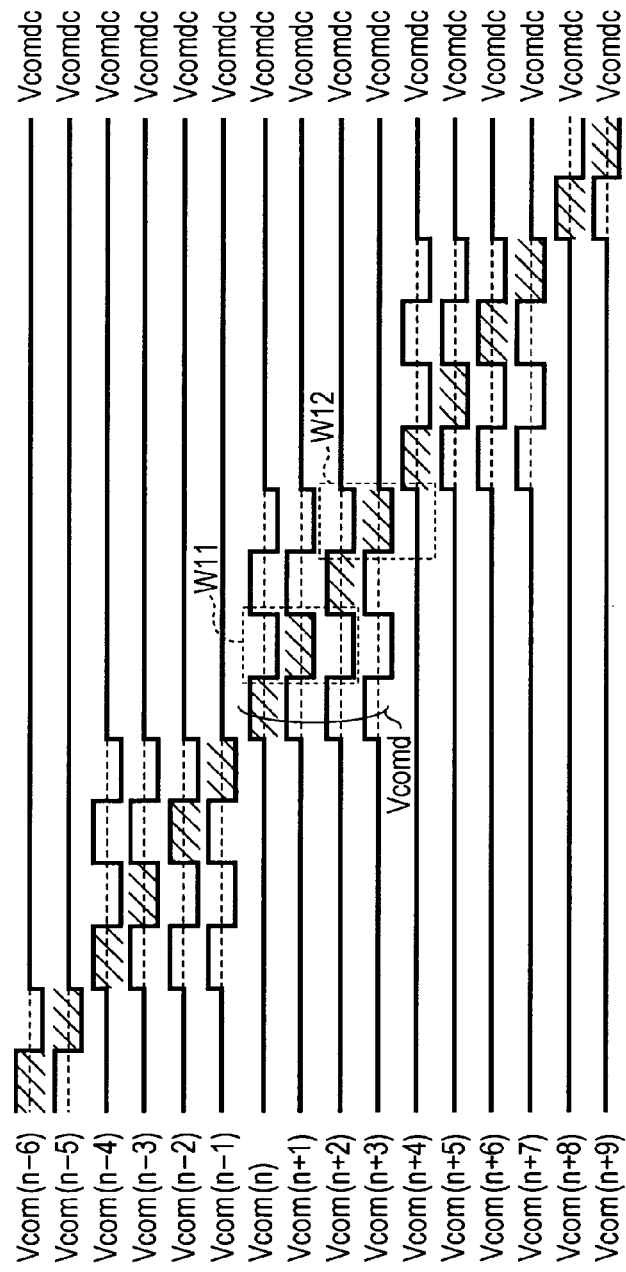
FIG. 13 is a timing waveform chart illustrating an example of operation of a scan drive section according a variation to the first embodiment.

FIG. 13 illustrates an example of display drive operation of the scan drive section 50B. As shown in FIG. 13, the scan drive section 50 drives the drive electrodes COML for each four electrodes. Specifically, the scan drive section 50 applies the display drive signal Vcomd (for example, drive signals Vcomd(n) to Vcom(n+3)) to four adjacent drive electrodes COML (for example, the n-th to the (n+3)-th drive electrodes COML(n) to COML(n+3)), respectively, and applies the scan signal Vscan to the scan signal lines (for example, scan signal line GCL(n) to GCL(n+3)) corresponding to these drive electrodes COML in sequence. And the source driver 13 applies the pixel signal Vpix to the pixels Pix of that horizontal line.

The circuit size of the touch-detection scan section 52B and drive section 530B according to the present variation becomes about ¼ the circuit size of the touch-detection scan section 52R and the drive section 530R according to the above-described comparative example. In this manner, by increasing the number of the drive electrodes COML to be driven at the same time, it is possible to further miniaturize the apparatus and to reduce power consumption.

3. Second Embodiment

Next, a description will be given of a display apparatus with a touch detection function 7 according to a second embodiment of the present disclosure. The display apparatus with a touch detection function 7 drives the drive electrode COML for each two electrodes, and applies the display drive signal Vcomd to the drive electrodes COML and the adjacent drive electrodes COML related to the horizontal line to which the pixel signal Vpix is applied by the source driver 13. The display apparatus with a touch detection function 7 is constructed using a scan drive section 70 having a drive electrode driver 16 performing such drive on the drive electrode COML. The other configuration is the same as that of the above-described first embodiment (FIG. 1). In this regard, a same reference numeral is given to a part having substantially a same configuration as that of the display apparatus with a touch detection function 1 according to the above-described first embodiment, and the description thereof will be suitably omitted.

Figure 14:
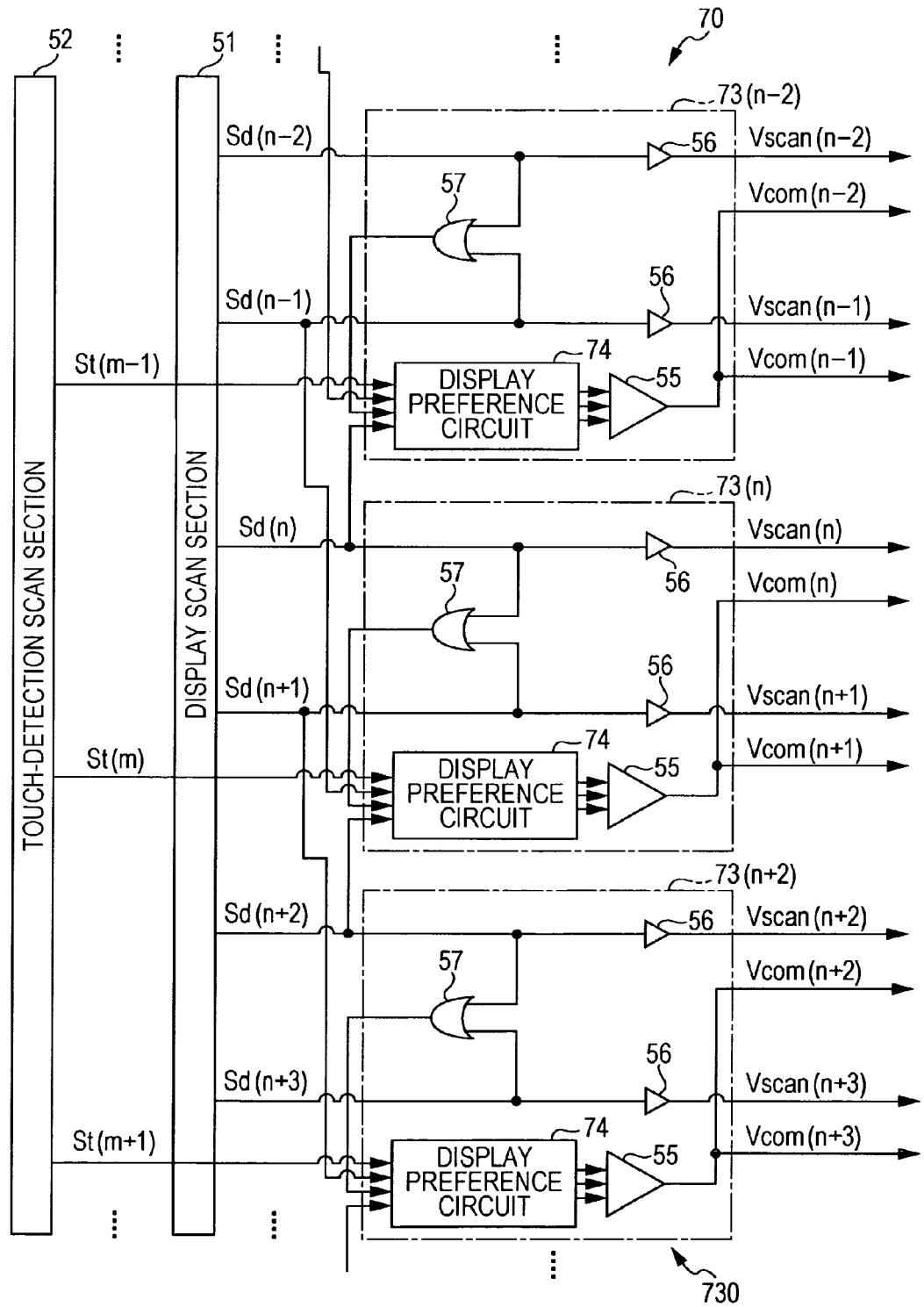
FIG. 14 is a block diagram illustrating an example of a configuration of a scan drive section according to a second embodiment.

FIG. 14 illustrates an example of a configuration of the scan drive section 70. The scan drive section 70 achieves the functions of the gate driver 13 and the drive electrode driver 16. The scan drive section 70 includes a drive section 730. The drive section 730 includes N/2 drive sections 73(1) to 73(N/2). The drive section 73 has a display preference circuit 74.

In the drive section 73(n), if at least one of the signals Sd(n−1) and Sd(n+2) supplied from the display scan section 51 is a high level, the display preference circuit 74 interprets it as an instruction to display-drive, and thus the drive signal buffer 55 applies the display drive signal Vcomd to both of the drive electrodes COML(n) and COML(n+1). If the signal St(n) supplied from the touch-detection scan section 52 is a high level, the display preference circuit 74 interprets it as an instruction to touch-detection drive, and thus the drive signal buffer 55 applies the touch-detection drive signal Vcomt to both of the drive electrodes COML(n) and COML(n+1). Also, if at least one of the signals Sd(n−1) and Sd(n+2) supplied from the display scan section 51 is a high level, and the signal St(n) supplied from the touch-detection scan section 52 is a high level, the drive signal buffer 55 applies the display drive signal Vcomd to both of the drive electrodes COML(n) and COML(n+1). That is to say, if the display preference circuit 74 receives both of the instructions of the display drive and the touch-detection drive, the display preference circuit 74 gives preference to the instruction of the display drive. Also, if the signals Sd(n−1) and Sd(n+2) supplied from the display scan section 51 are both low level, and when the signal St(n) supplied from the touch-detection scan section 52 is a low level, the display preference circuit 74 interprets it as neither the instruction of the display drive nor the instruction of the touch-detection drive, and thus the drive signal buffer 55 applies the direct-current drive signal Vcomdc to both of the drive electrodes COML(n) and COML(n+1).

Figure 15:
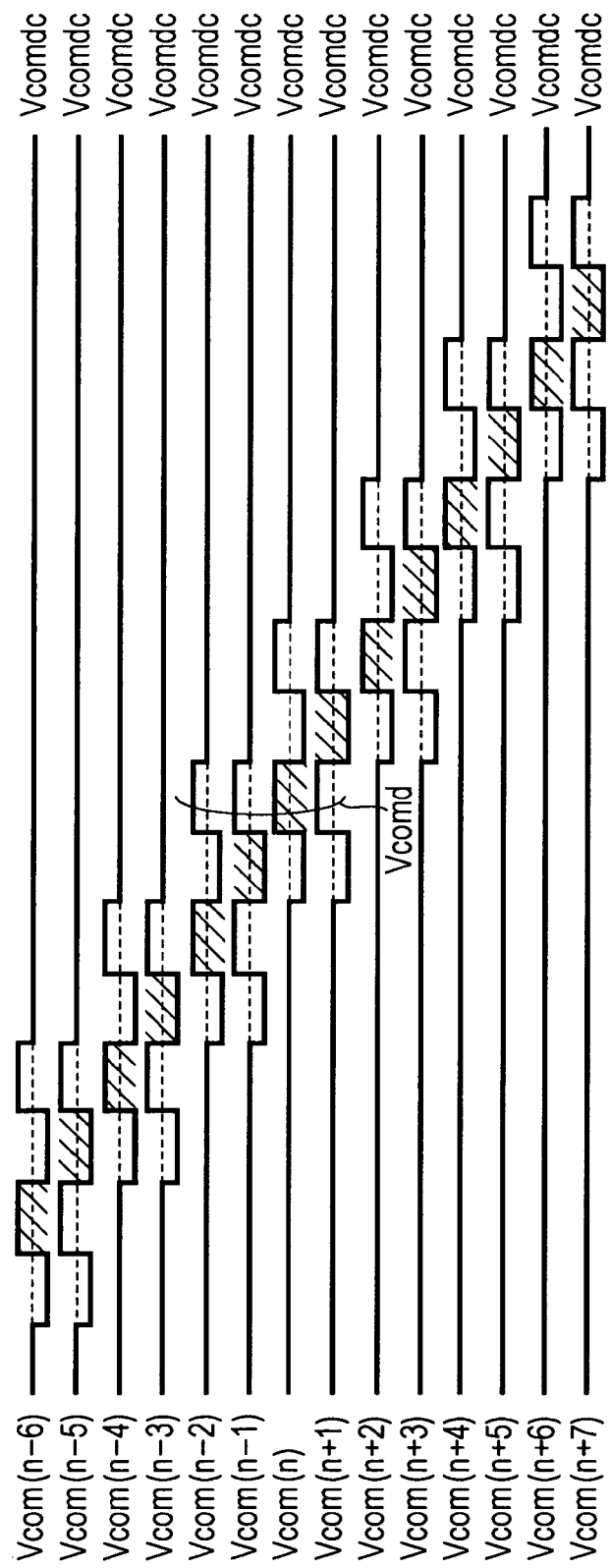
FIG. 15 is a timing waveform chart illustrating an example of operation of a scan drive section according to the second embodiment.

FIG. 15 illustrates an example of display drive operation of the scan drive section 70. As shown in FIG. 15, the scan drive section 70 drives the drive electrode COML for each two electrodes, and applies the display drive signal Vcomd to four drive electrodes COML all the time. And the scan drive section 70 applies the scan signal Vscan in sequence to the scan signal line GCL corresponding to the drive electrode COML to which the display drive signal Vcomd has been applied. And the source driver 13 applies the pixel signal Vpix to the pixels Pix of the horizontal line. At that time, the scan drive section 70 drives so as to apply the display drive signal Vcomd to the adjacent drive electrodes COML thereto in addition to the drive electrodes COML related to the horizontal line to which the pixel signal Vpix is applied. That is to say, when the scan drive section 70 drives the drive electrode COML for each two electrodes, the scan drive section 70 applies the display drive signal Vcomd to the four drive electrodes COML including the drive electrodes COML (a shaded portion) related to the horizontal line to which the pixel signal Vpix is applied and the adjacent drive electrodes COML.

In a display apparatus with a touch detection function 7 according to the present embodiment, the display drive signal Vcomd is applied to the drive electrodes COML related to the horizontal line to which the pixel signal Vpix is applied, and the adjacent drive electrodes COML thereto so that display disorder caused by the adjacent drive electrodes COML can be suppressed. In the following, a description will be given of the advantages using several figures. In this regard, for the sake of convenience of description, a description will be given of an example of driving the drive electrode COML for each one electrode.

Figure 16:
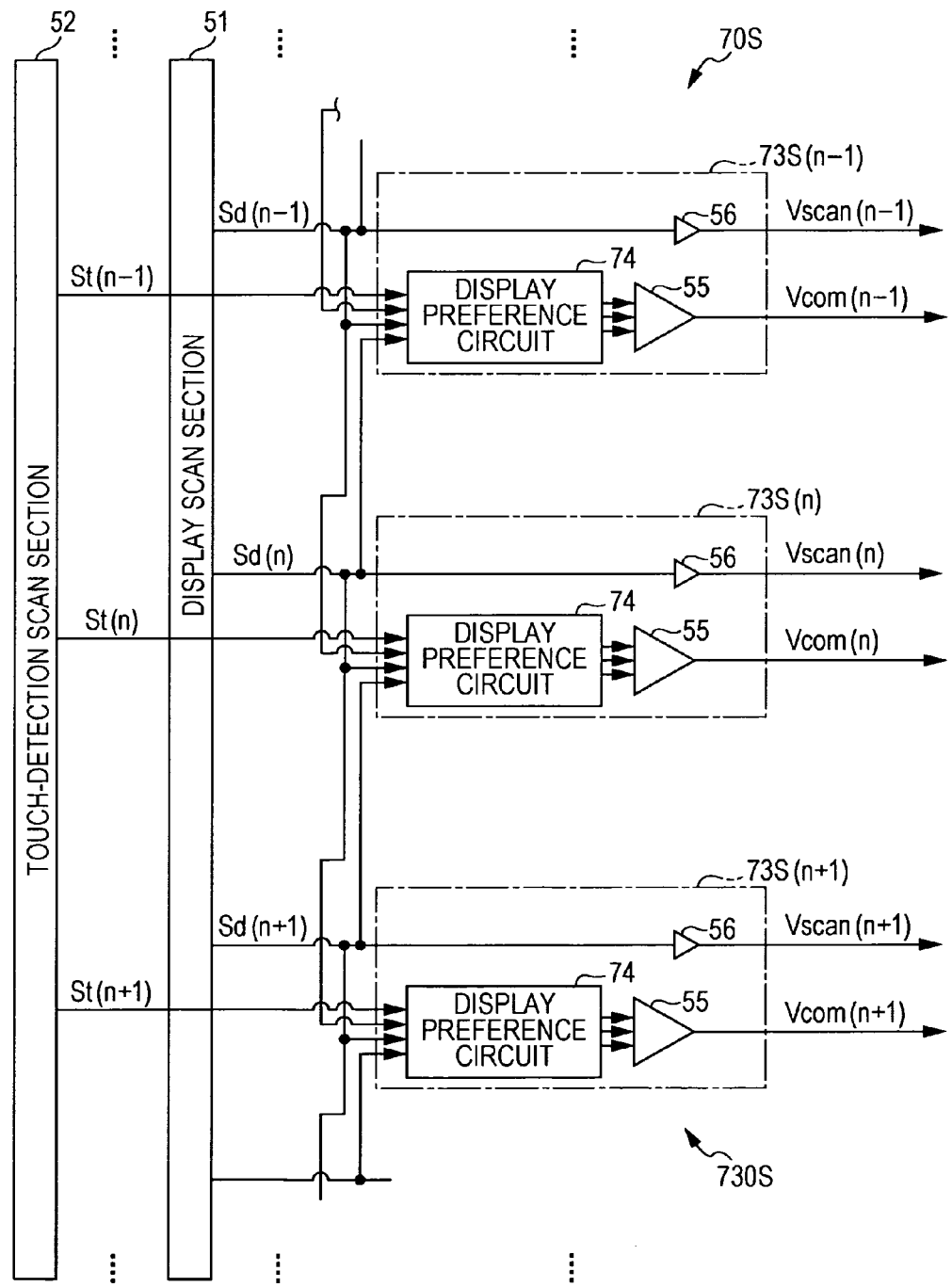
FIG. 16 is a block diagram illustrating an example of a configuration of a scan drive section for explaining operation of a scan drive section according to the second embodiment.

FIG. 16 illustrates an example of a configuration of a scan drive section 70S. The scan drive section 70S drives the drive electrode COML for each one electrode. The scan drive section 70S includes a drive section 730S. The drive section 730S includes N drive section 73S(1) to 73S(N).

In the drive section 73S(n), if at least one of the signals Sd(n−1) and Sd(n+1) supplied from the display scan section 51 is a high level, the display preference circuit 74 interprets it as an instruction to display-drive, and thus the drive signal buffer 55 applies the display drive signal Vcomd to both of the drive electrodes COML(n) and COML(n+1). If the signal St(n) supplied from the touch-detection scan section 52 is a high level, the display preference circuit 74 interprets it as an instruction to touch-detection drive, and thus the drive signal buffer 55 applies the touch-detection drive signal Vcomt to both of the drive electrodes COML(n) and COML(n+1). Also, if at least one of the signals Sd(n−1) and Sd(n+1) supplied from the display scan section 51 is a high level, and the signal St(n) supplied from the touch-detection scan section 52 is a high level, the drive signal buffer 55 applies the display drive signal Vcomd to both of the drive electrodes COML(n) and COML(n+1). That is to say, if the display preference circuit 74 receives both of the instructions of the display drive and the touch-detection drive, the display preference circuit 74 gives preference to the instruction of the display drive. Also, if the signals Sd(n−1) and Sd(n+1) supplied from the display scan section 51 are both low level, and when the signal St(n) supplied from the touch-detection scan section 52 is a low level, the display preference circuit 74 interprets it as neither the instruction of the display drive nor the instruction of the touch-detection drive, and thus the drive signal buffer 55 applies the direct-current drive signal Vcomdc to both of the drive electrodes COML(n) and COML(n+1).

In display drive, when one of the signals from Sd(n−1) to Sd(n+1) is a high level, the drive section 73S(n) applies the display drive signal Vcomd to the drive electrode COML(n). That is to say, when the scan signal Vscan is applied to one of the scan signal lines GCL(n−1) to GCL(n+1) of the (n−1)-th to the (n+1)-th rows, and the horizontal line to which the pixel signal Vpix is applied is selected, the drive section 73S(n) applies the display drive signal Vcomd to the drive electrode COML(n) of the n-th row. To put it another way, the drive section 730S applies the display drive signal Vcomd to the drive electrode COML related to the horizontal line to which the pixel signal Vpix is applied and the adjacent drive electrodes COML thereto.

Figure 17:
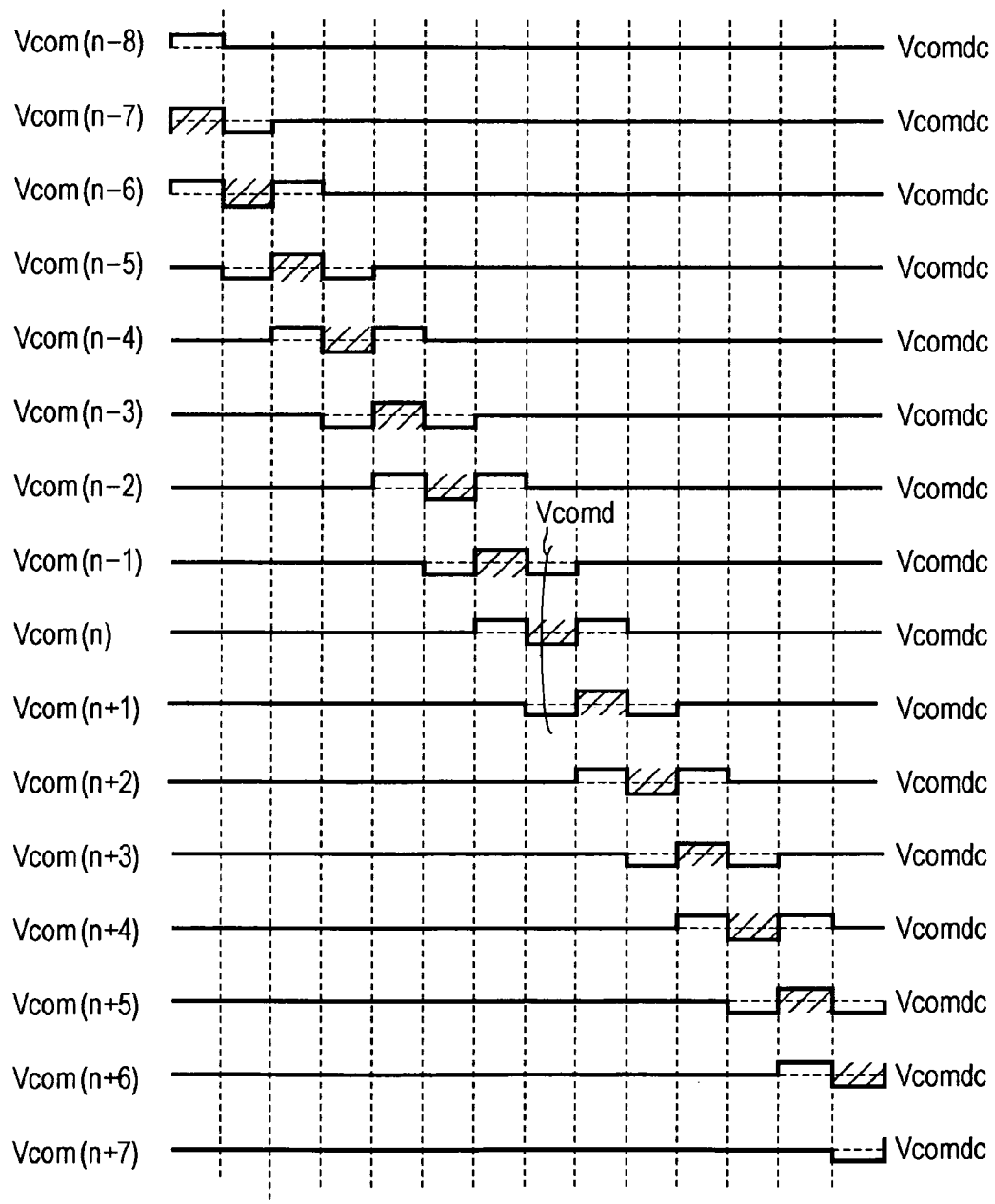
FIG. 17 is a timing waveform chart illustrating an example of operation of the scan drive section shown in FIG. 16.

FIG. 17 illustrates an example of the display drive operation of the scan drive section 70S. As shown in FIG. 17, the scan drive section 70S applies the display drive signal Vcomd (for example, drive signals Vcom(n−1) to Vcom(n+1)) to three adjacent drive electrodes COML (for example, the drive electrodes COML(n−1) to COML(n+1) of the (n−1)-th row to the (n+1)-th row). And the scan drive section 70S applies the scan signal Vscan to the scan signal line GCL (for example, the scan signal line GCL(n) of the n-th row) corresponding to the drive electrode COML positioned at the center of the three adjacent drive electrodes COML (for example, the drive electrode COML(n) of the n-th row). And the source driver 13 applies the pixel signal Vpix to the pixels Pix of the horizontal line. To put it another way, the scan drive section 70S applies the display drive signal Vcom to the drive electrodes COML related to the horizontal line to which the source driver 13 applies the pixel signal Vpix, and in addition to the adjacent drive electrodes COML.

In this case, as shown in FIG. 10, consider the case where the display scan Scand is overtaken by the touch detection scan Scant. At this time, the drive electrode COML to be subjected to display driving and the drive electrode COML to be subjected to touch detection driving overlap. At this time, as shown in FIG. 17, the scan drive section 70S, operates so as to give preference to display drive, and thus applies the display drive signal Vcomd to the adjacent three drive electrodes COML. That is to say, in the overtaking state, the scan drive section 70S applies the display drive signal Vcomd to the drive electrodes COML related to the horizontal line to which the source driver 13 applies the pixel signal Vpix and the adjacent drive electrodes COML thereto.

Figure 18:
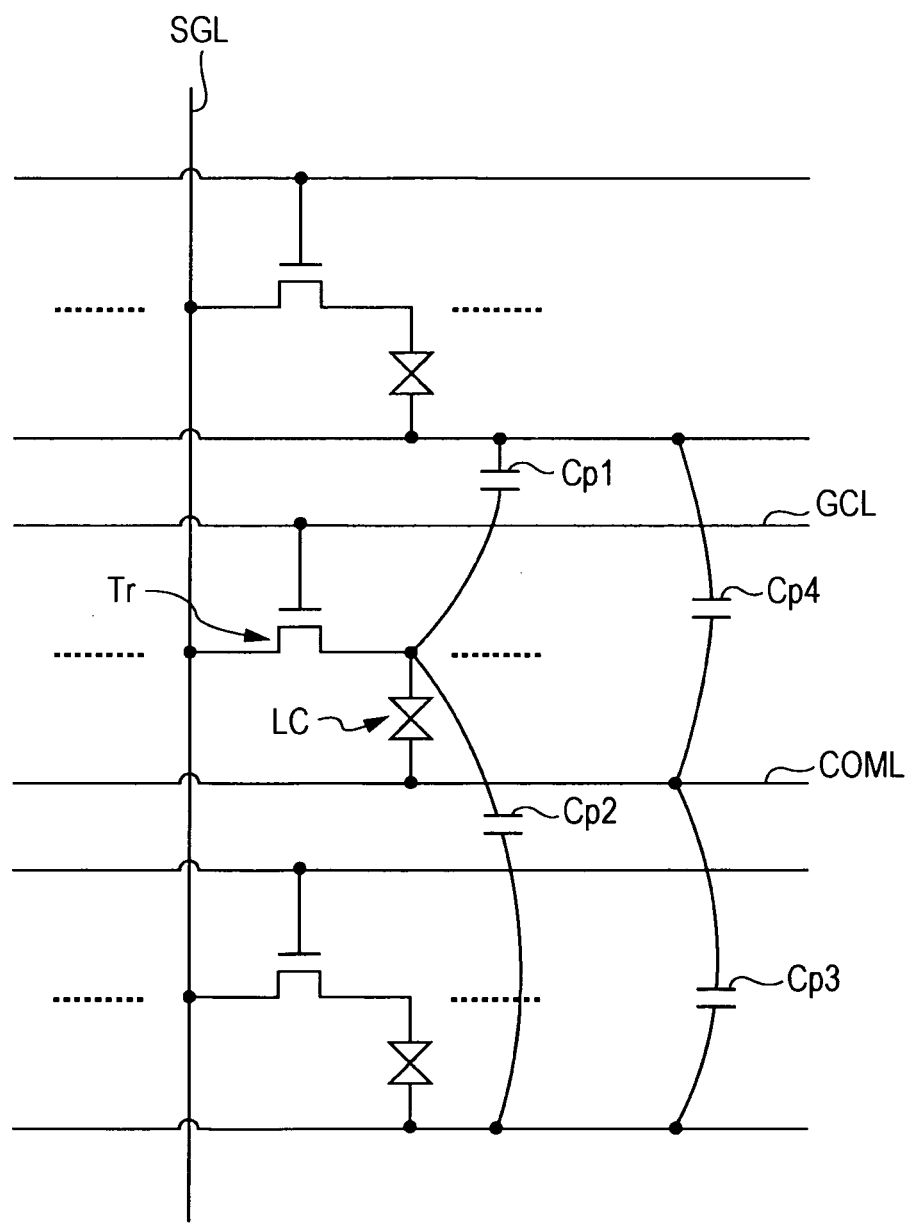
FIG. 18 is a circuit diagram for explaining an example of parasitic capacitance of a display device with a touch detection function according to an embodiment.

FIG. 18 illustrates parasitic capacitance in the liquid-crystal display device 20. As shown in FIG. 18, parasitic capacitance Cp1 to Cp4 are equivalently connected between both ends of the liquid crystal element LC and the adjacent drive electrodes COML. The parasitic capacitance Cp1 and Cp2 are capacitance provided between the drive electrodes COML adjacent to the liquid crystal element LC of interest and one of the terminals of the liquid crystal element LC (pixel electrode 22 in FIG. 5). The parasitic capacitance Cp3 and Cp4 are capacitance provided between the drive electrode COML adjacent to the liquid crystal element LC of interest and the other terminal of the liquid crystal element LC (common electrode COML). In this manner, parasitic capacitance Cp1 to Cp4 are provided between the liquid crystal element LC and the adjacent drive electrode COML.

For example, in the case where the display drive signal Vcomd is not applied to the drive electrode COML that is adjacent to the drive electrode COML related to the horizontal line to which the source driver 13 applies the pixel signal Vpix, the direct-current drive signal Vcomdc is applied to the adjacent drive electrode COML if not in the overtaking state, and the touch-detection drive signal Vcomt is applied if in the overtaking state. Accordingly, these signals might be transmitted to the liquid crystal element LC through the parasitic capacitance Cp1 to Cp4 so that disorder might occur on the display related to the liquid crystal element LC. That is to say, for example, in the overtaking state, the touch-detection drive signal Vcomt that has been applied to the adjacent drive electrode COML might be transmitted to the liquid crystal element LC through the parasitic capacitance so that the display of the horizontal line might be different from the case of not overtaking state. Specifically, in the overtaking state, the horizontal line to which the pixel signal Vpix is applied might be seen as "stripes".

On the other hand, in the scan drive section 70S, regardless of whether the overtaking state or not, the display drive signal Vcomd is applied all the time to the drive electrode COML that is adjacent to the drive electrode COML related to the horizontal line to which the source driver 13 applies the pixel signal Vpix. Accordingly, the display of the horizontal line is not influenced by whether in the overtaking state or not, and thus it is possible to keep display disorder caused by the adjacent drive electrodes COML to a minimum.

In the above, a description has been given of a method of suppressing display disorder caused by the adjacent drive electrode COML using the scan drive section 70S driving the drive electrode COML for each electrode. In a scan drive section 70 according to the present embodiment, it is possible to suppress display disorder in the quite same manner. That is to say, the scan drive section 70 applies the display drive signal Vcomd at least to the drive electrodes COML related to the horizontal line to which the source driver 13 applies the pixel signal Vpix and the adjacent drive electrode COML thereto. Thereby, as shown in FIG. 10, even if the display scan Scand is overtaken by the touch detection scan Scant, the display drive signal Vcomd is applied to the drive electrodes COML that is adjacent to the drive electrode COML related to the horizontal line to which the source driver 13 applies the pixel signal Vpix regardless of the overtaking state. Accordingly, the display of the horizontal line is not influenced by whether in the overtaking state or not, and thus it is possible to keep display disorder caused by the adjacent drive electrodes COML to a minimum.

As described above, in the present embodiment, the display drive signal Vcomd is applied to the drive electrodes COML related to the horizontal line to which the pixel signal Vpix, is applied, and the adjacent drive electrodes COML all the time, and thus it is possible to keep display disorder caused by the adjacent drive electrodes COML to a minimum.

4. Third Embodiment

Next, a description will be given of a display apparatus with a touch detection function 8 according to a third embodiment of the present disclosure. In the above-described second embodiment, the drive electrodes COML are driven for each two electrodes. However, in a display apparatus with a touch detection function according to the present embodiment, the drive electrodes COML are driven for each three electrodes or more. For an example, here, a description will be given of the case where the drive electrodes COML are driven for each four electrodes. The display apparatus with a touch detection function 8 is configured using a scan drive section 80 having a drive electrode driver 17 performing such drive on the drive electrode COML. The other configuration is the same as the configuration of the above-described first embodiment (FIG. 1), etc. In this regard, a same reference numeral is given to a part having substantially a same configuration as that of the display apparatus with a touch detection function 1 according to the above-described first embodiment, etc., and the description thereof will be suitably omitted.

Figure 19:
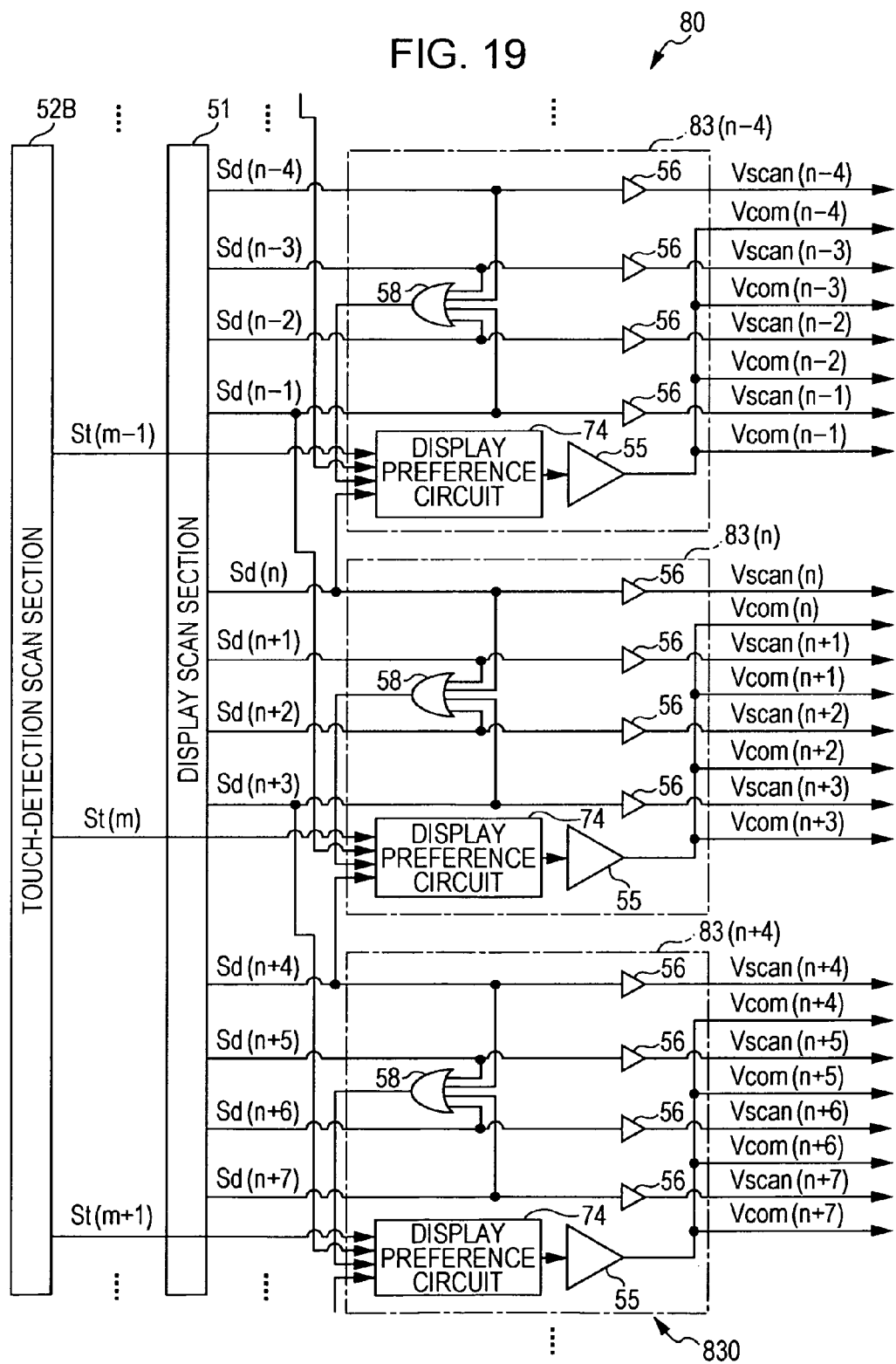
FIG. 19 is a block diagram illustrating an example of a configuration of a scan drive section according to a third embodiment.

FIG. 19 illustrates an example of a configuration of the scan drive section 80 according to the present embodiment. The scan drive section 80 includes a drive section 830. The drive section 830 includes N/4 drive sections 83(1) to 83(N/4).

In the drive section 83(n), if at least one of the signals Sd(n−1) and Sd(n+4) supplied from the display scan section 51 is a high level, the display preference circuit 74 interprets it as an instruction to display-drive, and thus the drive signal buffer 55 applies the display drive signal Vcomd to both of the drive electrodes COML(n) and COML(n+1). If the signal St(n) supplied from the touch-detection scan section 52B is a high level, the display preference circuit 74 interprets it as an instruction to touch-detection drive, and thus the drive signal buffer 55 applies the touch-detection drive signal Vcomt to both of the drive electrodes COML(n) and COML(n+1). If at least one of the signals Sd(n−1) and Sd(n+4) supplied from the display scan section 51 is a high level, and the signal St(n) supplied from the touch-detection scan section 52B is a high level, the drive signal buffer 55 applies the display drive signal Vcomd to both of the drive electrodes COML(n) and COML(n+1). That is to say, if the display preference circuit 74 receives both of the instructions of the display drive and the touch-detection drive, the display preference circuit 74 gives preference to the instruction of the display drive. Also, if the signals Sd(n−1) and Sd(n+4) supplied from the display scan section 51 are both low level, and when the signal St(n) supplied from the touch-detection scan section 52B is a low level, the display preference circuit 74 interprets it as neither the instruction of the display drive nor the instruction of the touch-detection drive, and thus the drive signal buffer 55 applies the direct-current drive signal Vcomdc to both of the drive electrodes COML(n) and COML(n+1).

Figure 20:
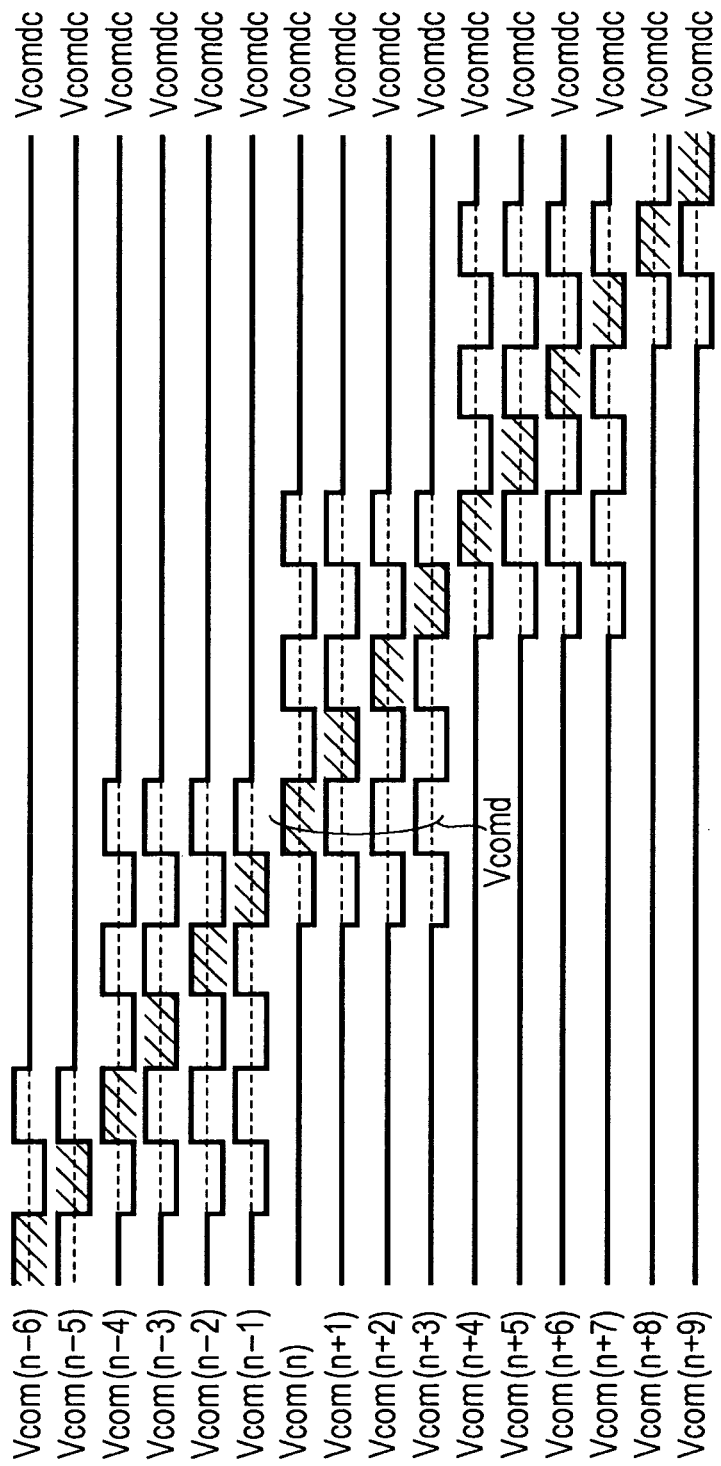
FIG. 20 is a timing waveform chart illustrating an example of operation of a scan drive section according to the third embodiment.

FIG. 20 illustrates an example of display drive operation of the scan drive section 80. As shown in FIG. 20, the scan drive section 80 drives the drive electrode COML for each four electrodes, and applies the display drive signal Vcomd to the four drive electrodes. And the scan drive section 80 applies the scan signal Vscan in sequence to the scan signal line GCL corresponding to the drive electrode COML to which the display drive signal Vcomd has been applied. And the source driver 13 applies the pixel signal Vpix to the pixels Pix of the horizontal line. At that time, the scan drive section 80 also drives so as to apply the display drive signal Vcomd to the drive electrodes COML that are adjacent to the drive electrodes COML (a shaded portion) related to the horizontal line to which the pixel signal Vpix is applied. That is to say, when the scan drive section 80 drives the drive electrodes COML for each four electrodes, if the source driver 13 applies the pixel signal Vpix to the horizontal line related to the two electrodes other than both ends out of the four electrodes, the scan drive section 80 applies the display drive signal Vcomd to the four drive electrodes COML. On the other hand, when the source driver 13 applies the pixel signal Vpix to the horizontal line related to two both ends of electrodes out of the four electrodes, the scan drive section 80 applies the display drive signal Vcomd to eight drive electrodes COML including the four adjacent drive electrodes.

In the display apparatus with a touch detection function 8 according to the present embodiment, in the case of driving the drive electrodes COML for each four electrodes, the display drive signal Vcomd is applied to the drive electrodes COML related to the horizontal line to which the pixel signal Vpix is applied and the adjacent drive electrodes COML thereto, and thus it is possible to keep display disorder caused by a relative positional relationship between the four drive electrodes COML and the horizontal line thereof to a minimum. In the following, a description will be given of the advantages with reference to the scan drive section 50B (FIG. 13) described in the variation of the above-described first embodiment.

As shown in FIG. 13, the scan drive section 50B applies the display drive signal Vcomd only to four drive electrodes COML all the time. At this time, when the source driver 13 applies the pixel signal Vpix to the horizontal line related to the two electrodes other than both ends of the four drive electrodes COML, the scan drive section 50B applies the same display drive signal Vcomd to the drive electrodes COML (a shaded portion) related to the horizontal line to which the pixel signal Vpix is applied, and the adjacent drive electrodes COML as shown by a waveform W11. On the other hand, when the source driver 13 applies the pixel signal Vpix to the horizontal line related to the two ends of the electrodes among the four drive electrodes COML, the scan drive section 50B applies the same display drive signal Vcomd to one of the drive electrodes COML (a shaded portion) related to the horizontal line to which the pixel signal Vpix is applied, and the adjacent drive electrodes COML as shown by a waveform W12, and applies the direct-current drive signal Vcomdc to the other of the adjacent drive electrodes COML. That is to say, the drive signal Vcom applied to the drive electrodes COML that is adjacent to the horizontal line is different depending on a relative positional relationship between the four drive electrodes COML to which the scan drive section 50B applies the display drive signal Vcomd and the horizontal line to which the source driver 13 applies the pixel signal Vpix. As shown in FIG. 18, when the signals of the adjacent drive electrodes COML are transmitted to the liquid crystal element LC through the parasitic capacitance Cp1 to Cp4, the difference among the signals of the drive electrodes COML, caused by the above-described relative positional relationship, is transmitted to the liquid crystal element LC, and thereby disorder might occur in the display related to the liquid crystal element LC.

In this manner, in the scan drive section 50B, when the influence of the parasitic capacitance Cp1 to Cp4 is strong, even if only display operation is considered (that is to say, when the overtaking state is not considered), display disorder might occur. Further, as shown by the above-described second embodiment, in consideration of touch detection operation in addition to display operation, display disorder caused by the adjacent drive electrodes COML might occur.

On the other hand, in the present embodiment, the display drive signal Vcomd is applied to the drive electrodes COML related to the horizontal line to which the source driver 13 applies the pixel signal Vpix and the adjacent drive electrodes COML all the time regardless of the above-described relative positional relationship. Accordingly, even in the case of considering only display operation, the display of the horizontal line is not influenced by the relative positional relationship, and thus it is possible to keep display disorder to a minimum.

Further, even in consideration of touch detection operation, the display drive signal Vcomd is applied all the time to the drive electrode COML that is adjacent to the drive electrode COML related to the horizontal line to which the source driver 13 applies the pixel signal Vpix regardless of whether the overtaking state or not. Accordingly, in the same manner as the above-described second embodiment, it is possible to keep display disorder caused by the adjacent drive electrodes COML to a minimum.

As described above, in the present embodiment, when the drive electrodes COML are driven for each four electrodes, the display drive signal Vcomd is also applied the to the drive electrodes COML adjacent to the horizontal line to which the pixel signal Vpix is applied, and thus it is possible to keep display disorder caused by the relative positional relationship between the four drive electrodes COML and the horizontal line thereof to a minimum. The other advantages are the same as those of the case of the above-described first and second embodiments.

5. Applications

Next, descriptions will be given of applications of the display apparatus with a touch detection function described in the above-described embodiments and variations with reference to FIG. 21 to FIG. 25G. A display apparatus with a touch detection function according to the above-described embodiments, etc., can be applied to electronic devices in all fields, such as a television set, a digital camera, a notebook-sized personal computer, a mobile terminal apparatus such as a cellular phone, etc., or a video camera, etc. To put it in another way, a display apparatus with a touch detection function according to the above-described embodiments, etc., can be applied to electronic devices in all fields, which display video signals input from the outside or video signals generated inside, as images or videos.

Application-1

Figure 21:
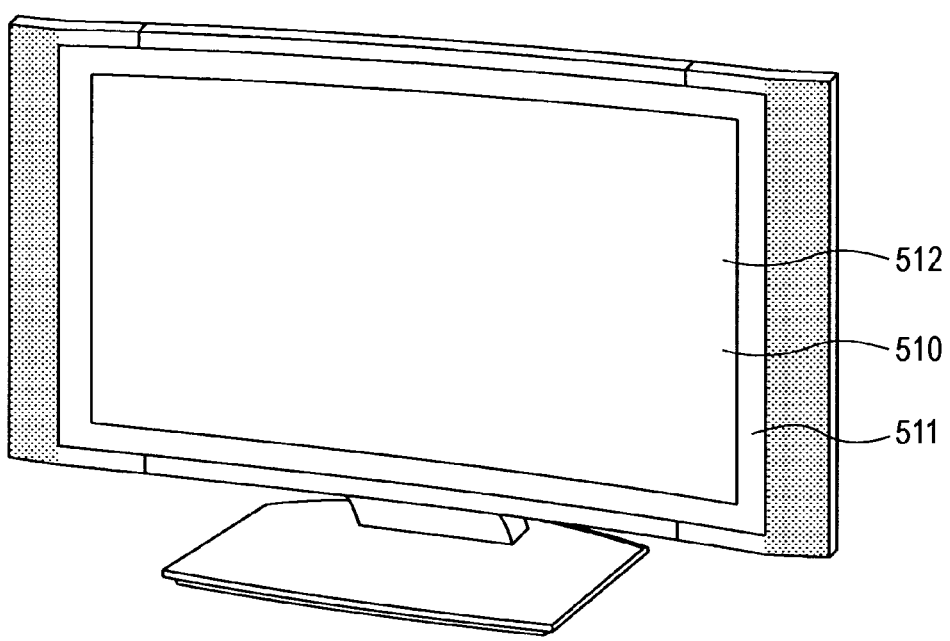
FIG. 21 is a perspective view illustrating an outer configuration of Application-1 among a display apparatus with a touch detection function to which an embodiment is applied.

FIG. 21 illustrates an outer view of a television set to which a display apparatus with a touch detection function according to the above-described embodiments, etc., is applied. The television set has a video-display screen section 510 including, for example, a front panel 511 and a filter glass 512. The video-display screen section 510 includes a display apparatus with a touch detection function according to the above-described embodiments, etc.

Application-2

Figure 22A:
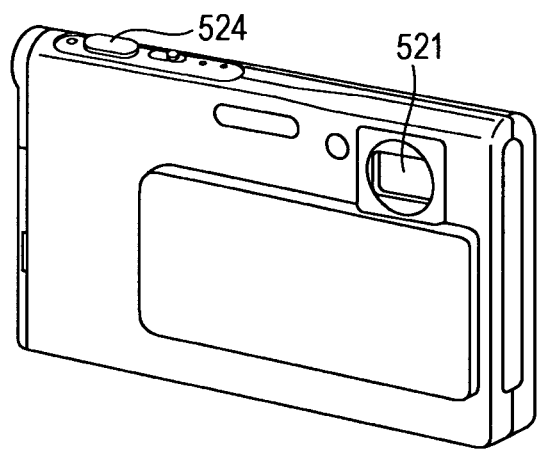
FIGS. 22A and 22B are perspective views illustrating an outer configuration of Application-2.
Figure 22B:
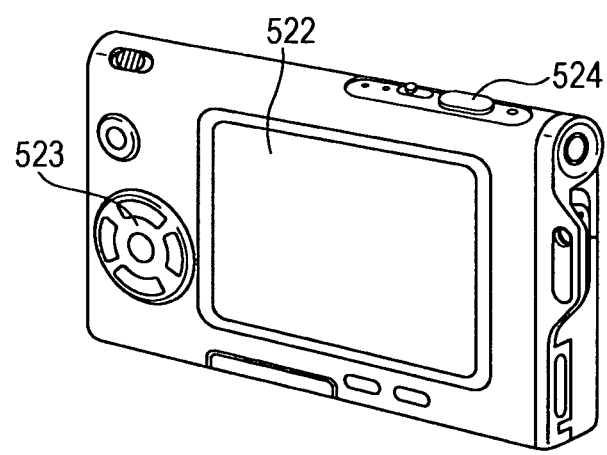

FIGS. 22A and 22B illustrate outer views of a digital camera to which a display apparatus with a touch detection function according to the above-described embodiments, etc., is applied. The digital camera has, for example, a flash-light emitting section 521, a display section 522, a menu switch 523 and a shutter button 524. The display section 522 includes a display apparatus with a touch detection function according to the above-described embodiments, etc.

Application-3

Figure 23:
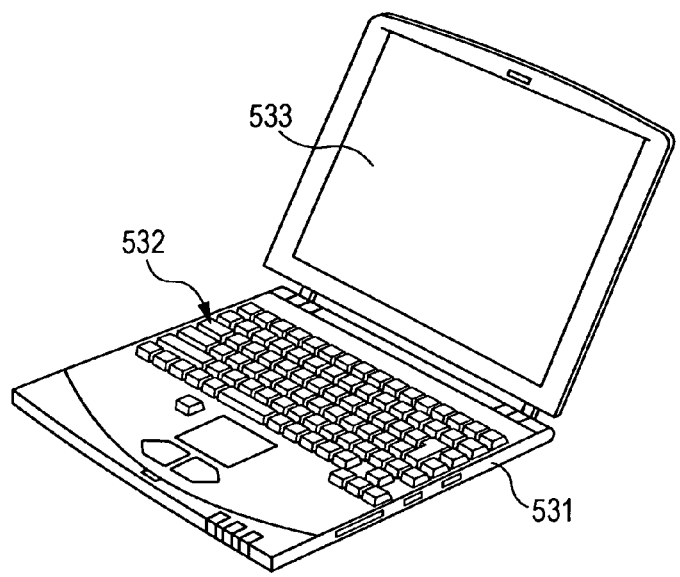
FIG. 23 is a perspective view illustrating an outer configuration of Application-3.

FIG. 23 illustrates an outer view of a notebook-sized personal computer to which a display apparatus with a touch detection function according to the above-described embodiments, etc., is applied. The notebook-sized personal computer has, for example, a main unit 531, a keyboard 532 for input operation of characters, etc., and a display section 533 for displaying images. The display section 533 includes a display apparatus with a touch detection function according to the above-described embodiments, etc.

Application-4

Figure 24:
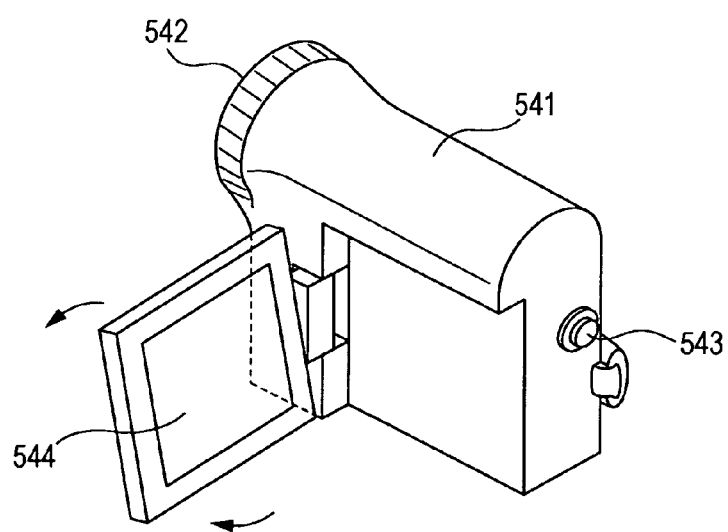
FIG. 24 is a perspective view illustrating an outer configuration of Application-4.

FIG. 24 illustrates an outer view of a video camera to which a display apparatus with a touch detection function according to the above-described embodiments, etc., is applied. The video camera has, for example, a main unit 541, a lens 542 for taking a subject, which is disposed at the front side of the main unit 541, a start/stop switch 543 at shooting time and a display section 544. And the display section 544 includes a display apparatus with a touch detection function according to the above-described embodiments, etc.

Application-5

FIGS. 25A to 25G illustrate outer views of a cellular phone to which a display apparatus with a touch detection function according to the above-described embodiments, etc., is applied. The cellular phone, for example, is constructed by linking an upper case 710 and a lower case 720 with a linking section (a hinge section) 730, and includes a display unit 740, a sub-display unit 750, a picture light 760 and a camera 770. The display unit 740 or the sub-display unit 750 includes a display apparatus with a touch detection function according to the above-described embodiments, etc.

In the above, descriptions have been given of the several embodiments and the variations, and the applications to electronic devices. However, the present disclosure is not limited to these embodiments, etc., and various variations are possible.

Figure 26:
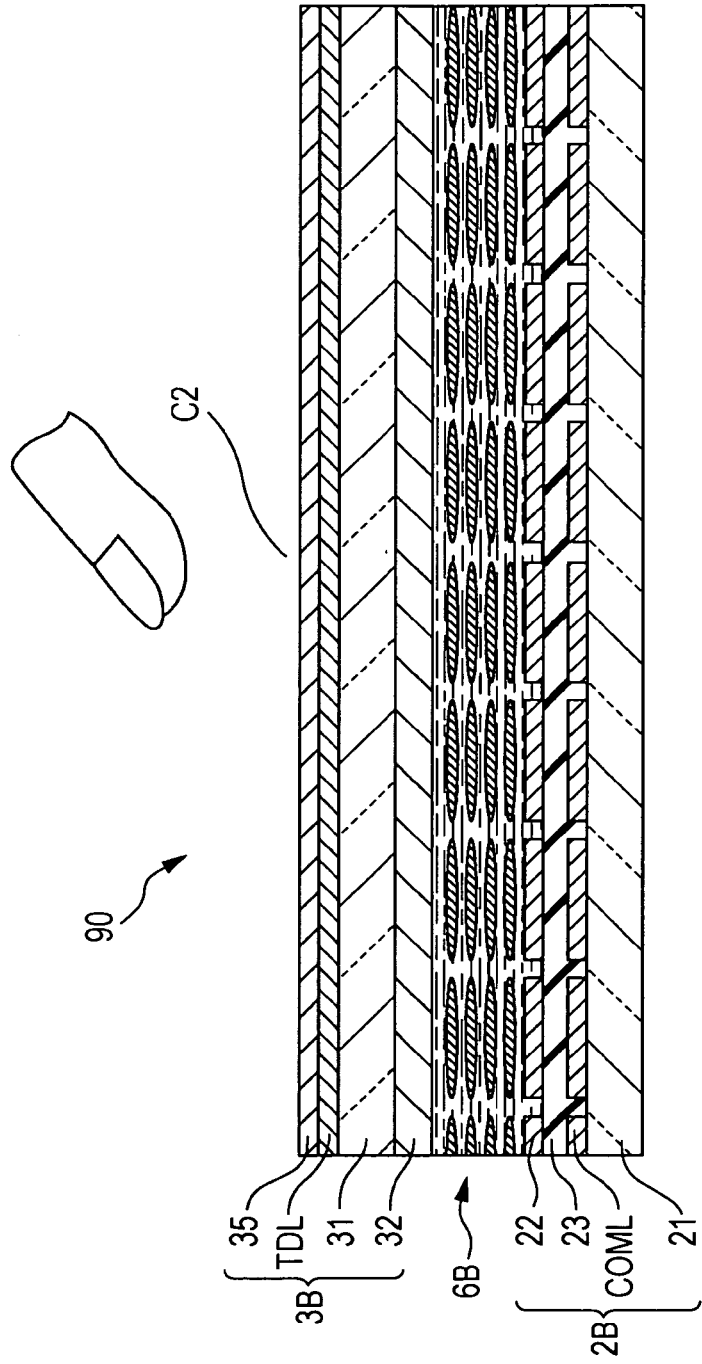
FIG. 26 is a sectional view illustrating a schematic sectional structure of a display device with a touch detection function according to a variation of each embodiment.

In each of the embodiments, etc., the display apparatus with a touch detection function 10 is configured by integrating a liquid-crystal display device 20 using a liquid crystal of various kinds of mode, such as TN, VA, ECB, etc., and a touch detection device 30. However, a liquid-crystal display device using a liquid crystal of a lateral field mode, such as FFS (a fringe field switching), IPS (in-plane switching), etc., and a touch detection device may be integrated in place of this. For example, in the case of using a liquid crystal of a lateral field mode, a display device with a touch detection function 90 may be configured as shown in FIG. 26. This figure illustrates an example of a sectional structure of a substantial part of the display device with a touch detection function 90, and shows a state in which a liquid crystal layer 6B is sandwiched between the pixel substrate 2B and the counter substrate 3B. Names and functions, etc., of the other individual sections are the same as those of the case in FIG. 5, and thus the descriptions thereof will be omitted. In this example, as is different from the case in FIG. 5, the drive electrodes COML used both for display and touch detection are formed immediately on a TFT substrate 21, and constitute a part of the pixel substrate 2B. Pixel electrodes 22 are disposed above the drive electrodes COML through an insulating layer 23. In this case, all dielectric materials including a liquid crystal layer 6B between the drive electrode COML and the touch detection electrode TDL contribute to forming the capacitor C1.

Figure 27A:
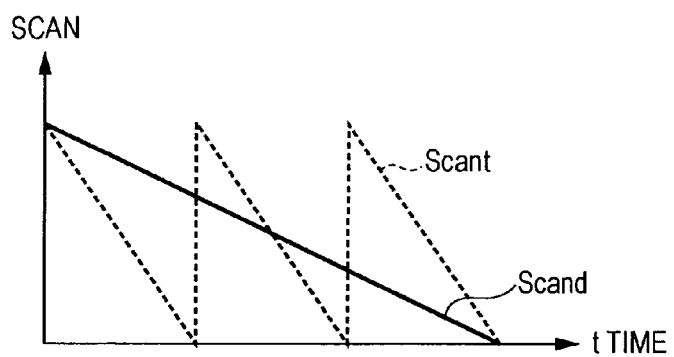
FIGS. 27A and 27B are schematic diagrams illustrating examples of operation of a display apparatus with a touch detection function according to variations of each embodiment.
Figure 27B:
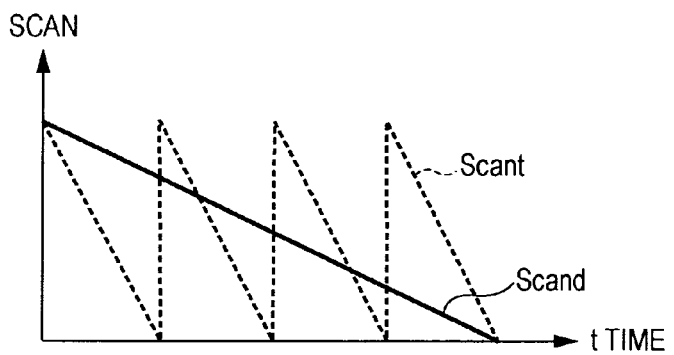

In each of the embodiments, etc., touch detection scan is performed at a speed two times a speed of display scan. However, the present disclosure is not limited to this, and touch detection scan may be performed at any speed as far as overtaking scan is performed. For example, touch detection scan may be performed at a speed three times a speed of display scan as shown in FIG. 27A. Alternatively, touch detection scan may be performed at a speed four times the speed of as shown in FIG. 27B.

The present disclosure contains subject matter related to that disclosed in Japanese Priority Patent Application JP 2010-186196 filed in the Japan Patent Office on Aug. 23, 2010, the entire contents of which are hereby incorporated by reference.

What is claimed is:

1. A display apparatus with a touch detection function, comprising:

groups of common drive electrodes, each of the groups including a plurality of the common drive electrodes, disposed in parallel so as to extend in one direction;

a plurality of display elements configured to display on the basis of a pixel signal and a display drive signal;

a plurality of touch detection elements configured to detect an external object on the basis of a touch-detection drive signal;

a first signal line for applying to the display elements a signal indicating a row to be displayed, the first signal line being provided corresponding to each of the common drive electrodes;

a second signal line for applying to each of the common drive electrodes the touch-detection drive signal, the second signal line being solely provided for each of the groups of the common drive electrodes; and a scan drive section configured to perform first scan driving having a first scan speed to apply the display drive signal to each of the groups of the common drive electrodes sequentially by time division and second scan driving having a second scan speed different from the first scan speed of the first scan driving to apply the touch-detection drive signal to each of the groups of the common drive electrodes sequentially by time division, wherein the scan drive section includes a plurality of drive sections each disposed between each of the groups of the common drive electrodes and the sole second signal line, each of the plurality of drive sections includes a circuit portion connected to at least two of the display drive signals adjacent to each other, and another circuit portion connected to the circuit portion and one of the touch detection drive signal, the other circuit portion applying not the touch-detection drive signal but the display drive signal to the common drive electrodes if at least one of the display drive signals and the touch detection drive signal are active at the same time, the each of the plurality of drive sections is configured to apply the touch-detection drive signal to all of the common drive electrodes of the group associated therewith in response to a signal from the sole second signal line, and configured to, upon any one of the plurality of first signal lines indicating the row of the display elements to be displayed, apply the display drive signal to all of the common drive electrodes of the group associated therewith, the scan drive section drives the common drive electrodes for each of the groups of the electrodes in the first scan driving and the second scan driving, a scan direction of the second scan driving is constant, the second scan speed is a speed in which the second scan driving overtakes the first scan driving when the first scan driving is performed at the first scan speed, and the scan drive section applies not the touch-detection drive signal but the display drive signal to each of the groups of the common drive electrodes to be subject to the first scan driving and the second scan driving when the second scan driving overlaps the first scan driving.

2. The display apparatus with a touch detection function according to claim 1, wherein in the first scan driving, the scan drive section applies the same display drive signal to a common drive electrode corresponding to a display element having the pixel signal applied thereto and at least to a common drive electrode adjacent to the common drive electrode.

3. The display apparatus with a touch detection function according to claim 1, wherein the display element is a liquid-crystal display element.

4. The display apparatus with a touch detection function according to claim 1, wherein the touch detection element detects the external approaching object using a change in electrostatic capacitance on the basis of proximity or touch of the external approaching object.

5. The display apparatus with a touch detection function according to claim 1, wherein the scan drive section includes a display priority circuit configured to apply not the touch-detection drive signal but the display drive signal to each of the groups of the common drive electrodes to be subject to the first scan driving and the second scan driving when the second scan driving overlaps the first scan driving.

6. A display apparatus comprising:

groups of drive electrodes, each of the groups including a plurality of drive electrodes, disposed in parallel so as to extend in one direction;

a plurality of display elements configured to display on the basis of a display drive signal;

a plurality of touch detection elements configured to detect on the basis of a touch-detection drive signal;

a first signal line for applying to the display elements a signal indicating a row to be displayed, the first signal line being provided corresponding to each of the common drive electrodes;

a second signal line for applying to each of the common drive electrodes the touch-detection drive signal, the second signal line being solely provided for each of the groups of the common drive electrodes; and a scan drive section configured to perform first scan driving having a first scan speed to apply the display drive signal to each of the groups of drive electrodes and second scan driving having a second scan speed different from the first scan speed of the first scan driving to apply the touch-detection drive signal to each of the groups of drive electrodes, wherein the scan drive section drives the includes a plurality of drive sections each disposed between each of the groups of the common drive electrodes and the sole second signal line, each of the plurality of drive sections includes a circuit portion connected to at least two of the display drive signals adjacent to each other, and another circuit portion connected to the circuit portion and one of the touch detection drive signal, the other circuit portion applying not the touch-detection drive signal but the display drive signal to the common drive electrodes if at least one of the display drive signals and the touch detection drive signal are active at the same time, the each of the plurality of drive sections is configured to apply the touch-detection drive signal to all of the common drive electrodes of the group associated therewith in response to a signal from the sole second signal line, and configured to, upon any one of the plurality of first signal lines indicating the row of the display elements to be displayed, apply the display drive signal to all of the drive electrodes of the group associated therewith, the scan drive section drives the common drive electrodes for each of the groups of the electrodes in the first scan driving and the second scan driving, a scan direction of the second scan driving is constant, the second scan speed is a speed in which the second scan driving overtakes the first scan driving when the first scan driving is performed at the first scan speed, and the scan drive section applies not the touch-detection drive signal but the display drive signal to each of the groups of the common drive electrodes to be subject to the first scan driving and the second scan driving when the second scan driving overlaps the first scan driving.

7. The display apparatus according to claim 6, wherein the scan drive section includes a buffer, and the buffer is disposed singly for each of the plurality of drive electrodes.

8. A drive circuit configured to be connected to a display section with a touch detection function, the display section including:

groups of common drive electrodes, each of groups including a plurality of the common drive electrodes, disposed in parallel so as to extend in one direction;

a plurality of display elements displaying on the basis of a pixel signal and a display drive signal; and a plurality of touch detection elements detecting an external object on the basis of a touch-detection drive signal, the drive circuit comprising:

a first signal line for applying to the display elements a signal indicating a row to be displayed, the first signal line being provided corresponding to each of the common drive electrodes;

a second signal line for applying to each of the common drive electrodes the touch-detection drive signal, the second signal line being solely provided for each of the groups of the common drive electrodes; and a scan drive section configured to perform first scan driving having a first scan speed to apply the display drive signal to each of the groups of the common drive electrodes sequentially by time division and second scan driving having a second scan speed different from the first scan speed of the first scan driving to apply the touch-detection drive signal to each of the groups of the common drive electrodes sequentially by time division, wherein the scan drive section includes a plurality of drive sections each disposed between each of the groups of the common drive electrodes and the sole second signal line, each of the plurality of drive sections includes a circuit portion connected to at least two of the display drive signals adjacent to each other, and another circuit portion connected to the circuit portion and one of the touch detection drive signal, the other circuit portion applying not the touch-detection drive signal but the display drive signal to the common drive electrodes if at least one of the display drive signals and the touch detection drive signal are active at the same time, the each of the plurality of drive sections is configured to apply the touch-detection drive signal to all of the common drive electrodes of the group associated therewith in response to a signal from the sole second signal line, and configured to, upon any one of the plurality of first signal lines indicating the row of the display elements to be displayed, apply the display drive signal to all of the drive electrodes of the group associated therewith, the scan drive section drives the common drive electrodes for each of the groups of the electrodes in the first scan driving and the second scan driving, a scan direction of the second scan driving is constant, the second scan speed is a speed in which the second scan driving overtakes the first scan driving when the first scan driving is performed at the first scan speed, and the scan drive section applies not the touch-detection drive signal but the display drive signal to each of the groups of the common drive electrodes to be subject to the first scan driving and the second scan driving when the second scan driving overlaps the first scan driving.

9. The drive circuit according to claim 8, wherein when a common drive electrode to be a target of the first scan driving and a common drive electrode to be a target of the second scan driving overlap, the scan drive section applies the display drive signal to the overlapping common drive electrode.

10. The drive circuit according to claim 9, wherein in the first scan driving, the scan drive section applies the same display drive signal to a common drive electrode corresponding to a display element having the pixel signal applied thereto and at least to a common drive electrode adjacent to the common drive electrode.

11. The drive circuit according to claim 9, wherein the display element is a liquid-crystal display element.

12. The drive circuit according to claim 9, wherein the touch detection element detects the external approaching object using a change in electrostatic capacitance on the basis of proximity or touch of the external approaching object.

13. A method of driving a display apparatus, the driving a display apparatus including:

groups of common drive electrodes, each of the groups including a plurality of the common drive electrodes, disposed in parallel so as to extend in one direction;

a plurality of display elements configured to display on the basis of a display drive signal;

a plurality of touch detection elements configured to detect on the basis of a touch-detection drive signal;

a first signal line for applying to the display elements a signal indicating a row to be displayed, the first signal line being provided corresponding to each of the common drive electrodes;

a second signal line for applying to each of the common drive electrodes the touch-detection drive signal, the second signal line being solely provided for each of the groups of the common drive electrodes; and a scan drive section configured to perform first scan driving having a first scan speed to apply the display drive signal to each of the groups of drive electrodes and second scan driving having a second scan speed different from the first scan speed of the first scan driving to apply the touch-detection drive signal to each of the groups of drive electrodes, wherein the scan drive section drives the includes a plurality of drive sections each disposed between each of the groups of the common drive electrodes and the sole second signal line, each of the plurality of drive sections includes a circuit portion connected to at least two of the display drive signals adjacent to each other, and another circuit portion connected to the circuit portion and one of the touch detection drive signal, the other circuit portion applying not the touch-detection drive signal but the display drive signal to the common drive electrodes if at least one of the display drive signals and the touch detection drive signal are active at the same time, the each of the plurality of drive sections is configured to apply the touch-detection drive signal to all of the common drive electrodes of the group associated therewith in response to a signal from the sole second signal line, and configured to, upon any one of the plurality of first signal lines indicating the row of the display elements to be displayed, apply the display drive signal to all of the drive electrodes of the group associated therewith, the scan drive section drives the common drive electrodes for each of the groups of the electrodes in the first scan driving and the second scan driving, a scan direction of the second scan driving is constant, and the second scan speed is a speed in which the second scan driving overtakes the first scan driving when the first scan driving is performed at the first scan speed, the method comprising:

first scan driving to apply the display drive signal to each of the groups of the common drive electrodes sequentially by time division;

second scan driving having a scan speed different from a scan speed of the first scan driving to apply the touch-detection drive signal to each of the groups of the common drive electrodes sequentially by time division; and applying not the touch-detection drive signal but the display drive signal to each of the groups of the common drive electrodes to be subject to the first scan driving and the second scan driving when the second scan driving overlaps the first scan driving.

14. An electronic device comprising:

a display apparatus with a touch detection function; and a control section performing operation control using the display apparatus with a touch detection function, wherein the display apparatus with a touch detection function, includes:

groups of common drive electrodes, each of groups including a plurality of the common drive electrodes, disposed in parallel so as to extend in one direction, a plurality of display elements configured to display on the basis of a pixel signal and a display drive signal, a plurality of touch detection elements configured to detect an external approaching object on the basis of a touch-detection drive signal, a first signal line for applying to the display elements a signal indicating a row to be displayed, the first signal line being provided corresponding to each of the common drive electrodes;

a second signal line for applying to each of the common drive electrodes the touch-detection drive signal, the second signal line being solely provided for each of the groups of the common drive electrodes; and a scan drive section configured to perform first scan driving having a first scan speed to apply the display drive signal to each of the groups of the common drive electrodes sequentially by time division and second scan driving having a second scan speed different from a scan speed of the first scan driving to apply the touch-detection drive signal to each of the groups of the common drive electrodes sequentially by time division, wherein the scan drive section drives the common includes a plurality of drive sections each disposed between each of the groups of the common drive electrodes and the sole second signal line, each of the plurality of drive sections includes a circuit portion connected to at least two of the display drive signals adjacent to each other, and another circuit portion connected to the circuit portion and one of the touch detection drive signal, the other circuit portion applying not the touch-detection drive signal but the display drive signal to the common drive electrodes if at least one of the display drive signals and the touch detection drive signal are active at the same time, the each of the plurality of drive sections is configured to apply the touch-detection drive signal to all of the common drive electrodes of the group associated therewith in response to a signal from the sole second signal line, and configured to, upon any one of the plurality of first signal lines indicating the row of the display elements to be displayed, apply the display drive signal to all of the drive electrodes of the group associated therewith, the scan drive section drives the common drive electrodes for each of the groups of the electrodes in the first scan driving and the second scan driving, a scan direction of the second scan driving is constant, the second scan speed is a speed in which the second scan driving overtakes the first scan driving when the first scan driving is performed at the first scan speed, and the scan drive section applies not the touch-detection drive signal but the display drive signal to each of the groups of the common drive electrodes to be subject to the first scan driving and the second scan driving when the second scan driving overlaps the first scan driving.

15. The electronic device according to claim 14, wherein when a common drive electrode to be a target of the first scan driving and a common drive electrode to be a target of the second scan driving overlap, the scan drive section applies the display drive signal to the overlapping common drive electrode.

16. The electronic device according to claim 15, wherein in the first scan driving, the scan drive section applies the same display drive signal to a common drive electrode corresponding to a display element having the pixel signal applied thereto and at least to a common drive electrode adjacent to the common drive electrode.

17. The electronic device according to claim 15, wherein the display element is a liquid-crystal display element.

18. The electronic device according to claim 15, wherein the touch detection element detects the external approaching object using a change in electrostatic capacitance on the basis of proximity or touch of the external approaching object.

* * * * *